(12) United States Patent
Golomb

(10) Patent No.: US 8,446,265 B2
(45) Date of Patent: *May 21, 2013

(54) INTEGRATED VEHICLE CONTROL SYSTEM AND APPARATUS

(75) Inventor: Adam Simon Golomb, Chicago, IL (US)

(73) Assignee: Golomb Mercantile Company LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,468

(22) Filed: May 7, 2012

(65) Prior Publication Data

US 2012/0221200 A1 Aug. 30, 2012

Related U.S. Application Data

(63) Continuation-in-part of application No. 12/555,477, filed on Sep. 8, 2009, now Pat. No. 8,198,996.

(51) Int. Cl.
*B60Q 1/00* (2006.01)
(52) U.S. Cl.
USPC ............ 340/425.5; 340/475; 701/36; 701/51; 701/1
(58) Field of Classification Search
USPC ........................................ 340/475; 701/36, 51
See application file for complete search history.

(56) References Cited

U.S. PATENT DOCUMENTS

| | | | |
|---|---|---|---|
| 1,651,540 A * | 12/1927 | Park | 340/465 |
| 2,068,632 A | 1/1936 | Stites | |
| 2,291,159 A | 7/1942 | Jacobi | |
| 4,567,217 A | 1/1986 | Yamazaki et al. | |
| 5,198,629 A | 3/1993 | Hayashi et al. | |
| 5,614,884 A | 3/1997 | Evans | |
| 5,666,102 A | 9/1997 | Lahiff | |
| 5,762,853 A | 6/1998 | Harris et al. | |
| 5,823,666 A * | 10/1998 | Kingsolver | 362/488 |
| 6,144,297 A * | 11/2000 | Donner | 340/475 |
| 6,961,644 B2 | 11/2005 | Mercier et al. | |
| 7,703,570 B2 | 4/2010 | Ringger et al. | |

(Continued)

FOREIGN PATENT DOCUMENTS

WO WO-0131543 5/2001

OTHER PUBLICATIONS

"Hands-On: A Practical Measure of the Perceived Risk of Driving Context," J.A. Thomas & D. Walton Opus Central Laboratories; Transit NZIHT 7th Annual Conference, pp. 1-10.

(Continued)

*Primary Examiner* — Kerri McNally
(74) *Attorney, Agent, or Firm* — Clark Hill PLC

(57) ABSTRACT

The present invention provides a system which integrates motor vehicle component operation into actuators located in the rim of a motor vehicle steering wheel. The two actuators of the system of the present invention are located in an arc segment of the steering wheel defined by the three o'clock and 12 o'clock positions for the right-hand actuator and the nine o'clock and 12 o'clock positions for the left-hand actuator. The actuators may operate in parallel with a conventional stalk switch or controls associated with an on board computer and only operate a motor vehicle component when activated and subsequently depressed. The integrated vehicle control system and apparatus of the present invention further provides for vehicle component operation which does not require a driver to remove his or her hands from the steering wheel.

34 Claims, 17 Drawing Sheets

U.S. PATENT DOCUMENTS

| | | | | |
|---|---|---|---|---|
| 7,845,457 B2 * | 12/2010 | Baluch et al. | ................. | 180/336 |
| 8,198,996 B2 * | 6/2012 | Golomb | ........................ | 340/475 |
| 2006/0044129 A1 * | 3/2006 | Patel | ............................. | 340/475 |

OTHER PUBLICATIONS

"A Large Area, Flexible Pressure Sensor Matrix With Organic Field-Effect Transistors for Artificial Skin Applications," Someya et al; PNAS Jul. 6, 2004, vol. 101, No. 27, pp. 9966-9970.

"Luna Innovations Fiber Optic Pressure Sensor", Trevor Rice, Luna Innovations (4 pages).

Web page printout 5 DOF Haptic Wand/Specialty (1 page).

RLP Engineering, Intellitrun "A Brief History of Turn Signals" /www.rlpengineering.com/history.htm (2 pages).

Tapecon Membrane Switch Division, Tapecon, Inc.; product/marketing brochure (16 pages).

SmartMotorist.com, "Where to Put Hand on the Steering Wheel?" (4 pages).

Master Molded Products Corporation, In-Mold Technology, product/marketing brochure (6 pages).

International Search Report and The Written Opinion of the International Searching Authority conducted for PCT/US12/51464.

\* cited by examiner

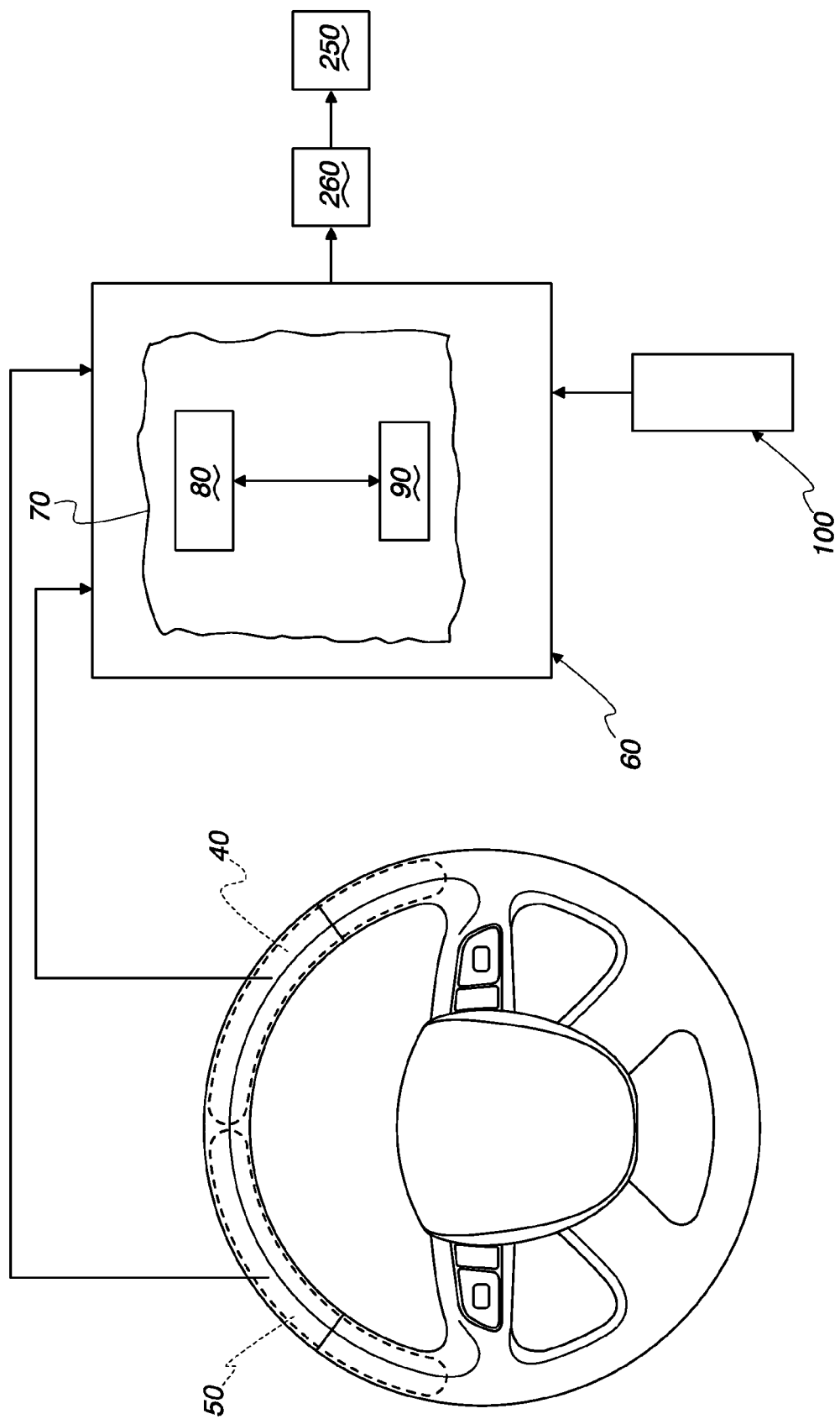

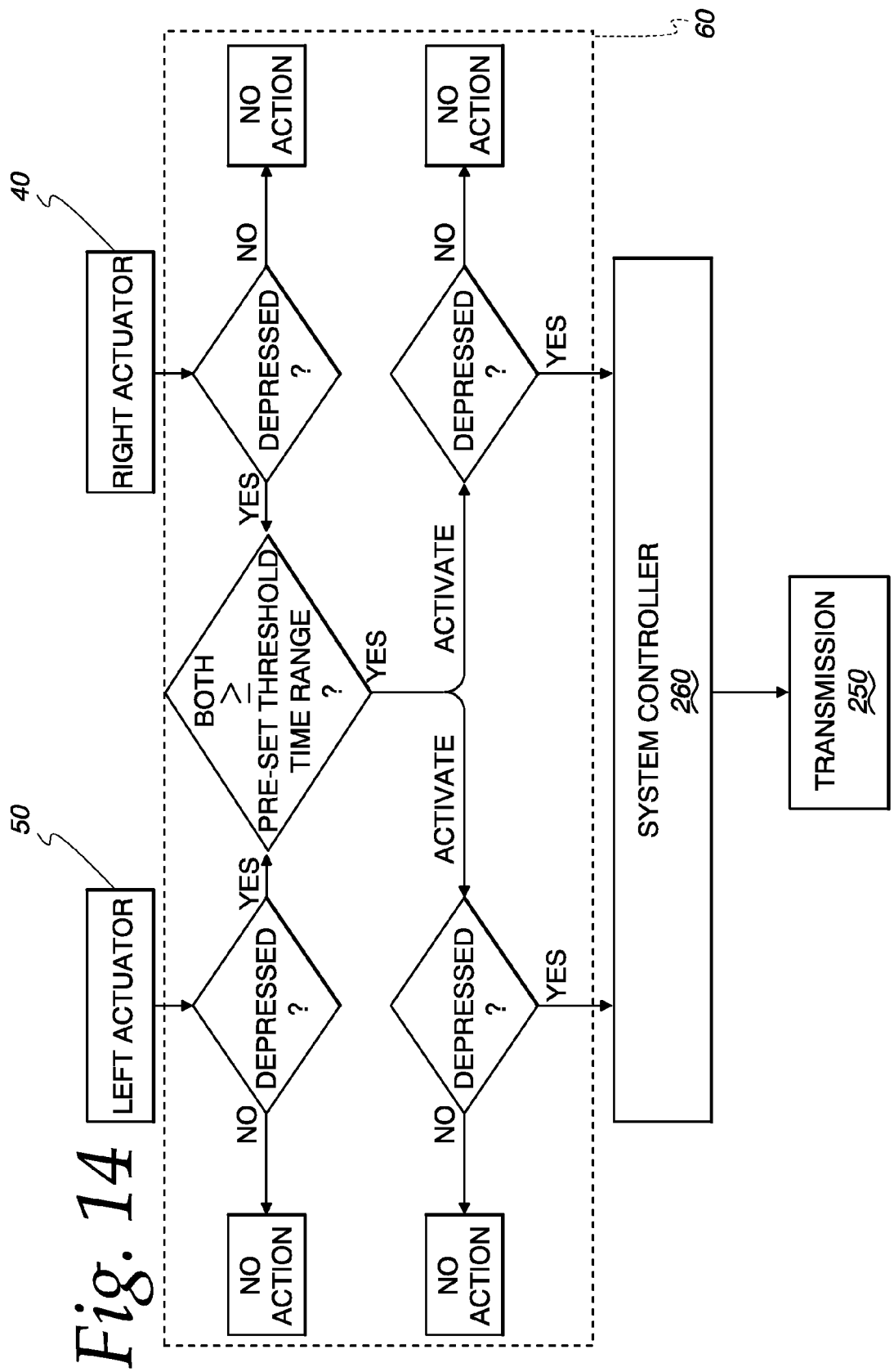

INTEGRATED VEHICLE CONTROL SYSTEM AND APPARATUS

CROSS REFERENCE TO RELATED APPLICATION

This application is a continuation in part of U.S. Non Provisional Application Ser. No. 12/555,477, filed on Sep. 8, 2009, and is incorporated herein by reference to the extent allowed by law.

FIELD OF THE INVENTION

The present invention relates to a vehicle control system and apparatus for operating the vehicle's components that is integrated into the rim of a vehicle's steering wheel in such a way as to be fully operable without a driver of the vehicle being required to remove his/her hands from the steering wheel.

BACKGROUND OF THE INVENTION

Vehicle turn signals, while having been in use on commercially available motor vehicles for about 70 years, have changed little since their first application. More recently, vehicles have been equipped with computer-operated functionality which allows the vehicle's driver or operator to control the vehicle's radio, compact disc player, connected devices, cellular telephone and navigation system, and other components through a central controller.

A vehicle steering wheel is commonly comprised of a column, central hub and annular ring with various components including a turn signal activation switch or switches. Typically turn signal lights are operated by a "stalk switch" or lever located to one side of the steering wheel. The stalk switch is moved upward to signal a right-hand turn and downward to signal a left-hand turn. When the stalk switch is moved up, lights located generally in the front and rear right side fenders begin to blink. Similarly, when the stalk switch is moved down, lights located generally in the front and rear left side fenders begin to blink. More typically, the stalk switch includes four positions, two up and two down. The first positions, either up or down, operate the turn signals but the stalk switch returns to the off position, or center, when released. The second of the positions maintains the turn signals on even when the stalk switch is released and shuts off after the steering wheel has been turned a fixed rotation and then returned to an approximately "wheels straight" position.

With the mechanism described above, several well-known problems arise. For example, turn signals may be left on with the signal lights "blinking" well after a turn is completed. A common condition is that signal lights turn off prematurely if the steering wheel is momentarily turned even slightly away from the direction of the turn. Another common condition is the failure of a turn signal to engage if the steering wheel is slightly turned in one direction and the driver attempts to signal a turn in the opposite direction. Such problems have existed since the turn signal was first installed on a motor vehicle.

Recent advances have addressed different physical configurations and different control mechanisms for improving on the operation of the turn signal. For example, more sophisticated in-vehicle computer hardware, such as those systems offered by RLP Engineering, Dayton, Ohio, has allowed for the real-time management of turn signal operation to address problems such as those described above. In such a system, vehicle speed, steering wheel position and other data are monitored in real time to determine whether the vehicle is turning and when the turn has been completed. However, even in such a computer-based system, the turn signal is activated by moving a stalk switch up or down to turn on the switch and the corresponding turn signal light. The turn signal of this computer-based system can be manually switched off by a button on the stalk switch. One disadvantage of this system is that one hand must be removed from the steering wheel in order to operate the stalk switch.

Other modifications of the turn signal have focused on replacing the stalk switch with buttons or paddles located in the hub of the steering wheel, such as the apparatuses illustrated in U.S. Pat. No. 5,739,491 to Crosson, Jr. and U.S. Patent Application Publication 2009/01655592 to Sakai et al. However, such modifications do not address the disadvantages described above. Specifically, placing the turn signal activation switches in the hub of the steering wheel still requires the driver either to remove one hand from the steering wheel or to release his grasp on the wheel in order to operate the hub-mounted switch. Such modifications also do not address problems arising when the turn signal is left on after a turn or when the turn signal prematurely turns off.

Spoke-mounted turn signal activation switches, such as those envisioned in U.S. Pat. No. 5,823,666 to Kingsolver, do not eliminate the requirement that a driver's hand must be repositioned to activate the switch even if the hand remains in contact with the steering wheel. The natural position of the driver's thumb is aligned with the rim of the steering wheel or wrapped partially around the rim of the steering wheel when the wheel is gripped. Therefore, a driver must release his/her grip from the steering wheel in order to re-position the thumb on the spoke mounted switch. This change in position is necessary regardless of the location of the spoke around the internal diameter of the steering wheel. If the driver's hand is located proximal to or in contact with the spoke and above the spoke, the driver must rotate the hand downward to contact the spoke-mounted switch. If the driver's hand is located proximal to or in contact with the spoke and below the spoke, the driver must either rotate the hand downward to contact the spoke-mounted switch or move the hand upward and rotate the thumb downward to make contact with the switch. Such a rotation or movement requires that the driver release his/her grip from the wheel in order to move the hand.

Even though the expressed advantage of placing the turn signal switch in the spoke of the steering wheel was that it would permit turn signal operation without the driver needing to remove his/her hands from the steering wheel, in practice a driver must re-position his/her hands to press the spoke-mounted switches. As addressed above, such a design, like those placing the turn signal activation switch in the steering wheel hub, permits the operation of the switch without removing one hand from the steering wheel in very limited and still undesirable positions of the hand relative to the steering wheel.

In U.S. Pat. No. 6,961,644 to Mercier et al., a steering wheel with hot buttons placed at the "10 o'clock" and "2 o'clock" positions on the steering wheel rim was posited. According to this publication, such a system would allow a driver to activate the hot buttons, thus activating a turn signal, by using a thumb. Such a process of activating a turn signal, according to this publication, would not require a driver "to even move his or her hands much." However, tests conducted demonstrated that the hot buttons of this hypothetical device cannot be pressed if the driver maintains a fully-wrapped four finger grip anywhere on the top half of the steering wheel. Therefore, this hypothetical device suffers from all of the problems of other earlier devices because it merely relocates the functionality of the turn signal stalk switch to hot buttons on the rim of the steering wheel. Turn signals may be inadvertently turned on by misplacement of the hand or remain on with the signal lights "blinking" well after a turn is completed. Turn signal lights may turn off prematurely if the steering wheel is momentarily turned even slightly away from the direction of the turn. Furthermore, with this hypothetical device the driver must loosen his or her grip on the steering wheel so that the hand may be rotated in order to put the thumb in position to operate the hot buttons.

According to "Hands-On: A Practical Measure of the Perceived Risk of the Driving Context," J. A. Thomas and D. Walton, Transit NZIHT $7^{th}$ Annual Conference (2005), most drivers place both hands somewhere on the top half of the steering wheel when driving under higher-risk or complex conditions. It follows then that most drivers feel that driving with two hands on the top half of the steering wheel, particularly during high-risk or complex driving situations, provides more control over the vehicle. As Paul A. Eisenstein noted in "Turn signal neglect a real danger, study shows," citing research by the Society of Automotive Engineers, "drivers either neglect to use their signals when changing lanes—or fail to turn the signals off—48% of the time." http://bottomline.msnbc.msn.com/_news/2012/05/01/11486051-turn-signal-neglect-a-real-danger-study-shows?lite. Eisenstein further notes, "when making a turn the failure rate is around 25%." Id.

A driver in many instances must remove one hand from the steering wheel in order to operate a stalk switch-activated turn signal because the stalk switch is typically not located in close enough proximity to the steering wheel. Regardless of the driver's hand position, one hand must always be removed from the steering wheel in order to operate a stalk switch-activated turn signal. Where the turn signal switches are located in the hub of the wheel, the result is essentially the same. Either the driver's hand must be removed from the steering wheel to activate the hub-mounted switch or the hand must be turned so that the thumb of the driver's hand can reach the hub-mounted switch. In turning the hand to stretch the thumb to reach the switch, a driver must release his/her grip on the steering wheel, even if the hand remains in contact with the steering wheel. Similarly, when the turn signal switch is located in a spoke of the steering wheel, the driver must reposition his or her hand in order to operate the spoke-mounted switch.

It would therefore be advantageous to have a turn signal activation switch and system which does not require that a driver release his/her grip from the steering wheel in order to operate the switch. It would be a further advantage to have a turn signal activation switch and system which can be operated during high-risk or complex driving situations while maintaining a two-handed grip on the steering wheel. It would be an additional advantage to have a turn signal activation switch and system that would not prematurely turn off or remain on after a turn. It would be yet a further advantage to have a turn signal activation switch and system that could not be accidently operated.

Computer-driver interfaces are also known for use on motor vehicles. Such interfaces may be used to control specific equipment components of the motor vehicle such as a radio, compact disc player, connected devices, or wireless communication devices. Interfaces such as the BMW IDRIVE system, AUDI MMI, system, MERCEDES COMMAND system, LEXUS REMOTE TOUCH system, FORD SYNC system and MYFORD TOUCH system, each offer variations on the same type of controls. Such computer-driver interfaces appear to be mouse/dial/joystick/touch screen combinations with the controls located in the proximate to a gear shift selector. Alternatively, such computer-driver interfaces may be located on stalk levers with buttons and switches attached, or in thumb-operated buttons located on the steering wheel horizontal spoke cross bar directly inwards from the steering wheel annular ring and proximal to the 3 o'clock and 9 o'clock positions on the annular ring. Information from such a computer system which controls the motor vehicle equipment components may be displayed to the motor vehicle operator via a screen in the center of the vehicle dashboard, on a screen in the vehicle operator's instrument cluster, and/or in a heads-up-display also known as a HUD.

The computer-driver interfaces typically cannot be operated with the motor vehicle operator maintaining a fully wrapped grip around the annular ring of the steering wheel, and would require repositioning of the hands especially if the hands were originally positioned on the upper half of the steering wheel. Some of the presently commercially available computer-driver interfaces have been criticized because their use requires a driver to look away from the road in order to locate and operate the interface.

It would therefore be advantageous to have a computer-driver interface and system which does not require that a driver release his/her grip from the steering wheel in order to operate the interface. It would be a further advantage to have a computer-driver interface and system which can be operated during high-risk or complex driving situations while maintaining a two-handed grip on the steering wheel. It would be an additional advantage to have a computer-driver interface and system that could not be accidentally operated.

Common to many personal digital assistants ("PDA") and cellular telephones are assignable keys that may also be referred to as "convenience keys." Convenience keys allow an operator to designate a specific function (camera, voice recorder, media player, etc.) on the PDA or cellular telephone. Many video game systems such as XBOX game system or PLAYSTATION game system, or personal computers as well as personal music devices such as an IPOD device include a menu which offers a subsection of controller where the operator may deviate from the native default settings of the device and assign specific functions to specific keys on the device. Personalized keys are also known for seat, steering wheel, mirrors and seat belt location settings and are found in many motor vehicles with control buttons usually on the door of the motor vehicle. Such personalized keys are analogous to radio presets and allow a driver to adjust selected elements to a pre-set value with the push of one button. It appears, however, that assignable/reassignable convenience keys are not available as integrated controls in the steering wheel of a motor vehicle.

It would therefore be advantageous to have a computer-driver interface and system which includes assignable/reassignable convenience keys that are integrated into the annular ring of a motor vehicle steering wheel so that an operator sitting behind the steering wheel would have the ability to assign a function to such convenience keys, and then have the option to change that function to a different function at will.

It appears that the operation of all paddle/thumb shifters on motor vehicles in the consumer marketplace require a driver of such motor vehicles to loosen or alter their fully wrapped four finger grip on the steering wheel of the motor vehicle. Many such paddles are especially used in sporty driving situations. It is reasonable to assume that the vehicle driver's underlying desire in those circumstances is to maintain as much control over the steering wheel as possible. Paddle shifters can be found dating back to at least 1912 and evolved in the consumer market to apparently mimic the FORMULA ONE automobile paddles which achieved racing success in the late 1980's. Today, most automobile manufacturers offers some variety of paddle shifters in at least one model of motor vehicle. It appears such paddle shifters have been marketed as a compromise, on the one hand, for car buyers who wanted access to both manual and automatic shifting of the motor vehicle's transmission's gears, and, on the other hand, as a faster shifting improvement over traditional manual transmissions on automobiles such as the FERRARI automobile.

It would therefore be advantageous to have paddle shifters for a motor vehicle integrated into the annular ring of the motor vehicle's steering wheel such that the driver of the motor vehicle would not have to loosen or alter a fully-wrapped four-finger grip on the steering wheel in order to operate the paddle shifters. It would be a further advantage to provide an integrated vehicle control system and apparatus which includes a computer-driver interface and system having assignable/reassignable convenience keys that are integrated into the annular ring of a motor vehicle steering wheel so that an operator could assign the paddle-shifter functionality to the convenience keys at will.

The advent of "hands free" controls in a vehicle has been primarily in response to the desire to keep a driver's hands on the wheel, not necessarily because drivers want to "speak" every command to operate the motor vehicle. There are many commands that drivers would prefer to keep secret. In the event of a carjacking or kidnapping, providing the driver with the ability to covertly send a distress call to 911 while appearing to simply drive the car with two hands on the wheel is a feature never before offered in the marketplace.

It would therefore be an advantage to have an integrated vehicle control system which can be operated during high-risk or complex driving situations while maintaining a two-handed grip on the steering wheel and facilitates the sending of a distress call to emergency personnel. In vehicles equipped with GPS systems, the distress call could also send emergency personnel a real-time location and potentially also activate a hidden camera in the car capturing a picture or video image. Cab drivers or bus drivers would no longer have to risk reaching for the radio or a "bank teller style" hidden button to call for help if an integrated vehicle control system were available which did not require a motor vehicle operator to remove his or her hands from the motor vehicle's steering wheel in order to operate.

It would also be an advantage to have a computer-driver interface and system which does not require that a driver release his/her grip from the steering wheel in order to operate the interface and which is further integrated with a motor vehicle's HUD system. It would be advantageous for a driver to be able to access a HUD system to obtain information such as the motor vehicle's speed, navigation information and location proximity alerts, or to access a vehicle's night vision capabilities, while allowing the driver to keep his or her eyes on the road while maintaining a fully-wrapped four-fingered grip on the motor vehicle's steering wheel.

SUMMARY OF THE INVENTION

The present invention provides an activation switch and system which is integral to the rim of a steering wheel and may be operated without the need for a driver to change his/her grip on the steering wheel. The present invention more specifically provides a motor vehicle thumb shifter system which permits shifting the motor vehicle's transmission while maintaining a two-handed four-fingered grip on the steering wheel during high-risk or complex driving situations. In a preferred embodiment, the present invention provides an integrated motor vehicle thumb shifter system for use with a motor vehicle steering wheel having an annular ring. The integrated motor vehicle thumb shifter system includes a left actuator, the left actuator attached to the steering wheel annular ring between the 9 o'clock and 12 o'clock positions on the annular ring; a right actuator, the right actuator attached to the steering wheel annular ring between the 3 o'clock and 12 o'clock positions on the annular ring; and a controller, the controller connected to the left and right actuators, the controller further connected to a system controller which causes the motor vehicle's transmission to shift gears. The left actuator and the right actuator of this embodiment do not overlap. Furthermore, the controller activates the left actuator and the right actuator when the left and the right actuators are depressed simultaneously and held for a pre-set threshold time, thus providing an activated left actuator and an activated right actuator. In accordance with the present invention, the transmission is shifted up and down through its gears when one of the left and right actuators is depressed. The integrated motor vehicle thumb shifter system of the present invention can cause the transmission to shift into the neutral position when the activated left and right actuators are simultaneously depressed. The integrated motor vehicle thumb shifter system can cause the transmission to shift into the park position when the activated left and right actuators are simultaneously depressed and the motor vehicle is not moving.

In still further embodiments of the present invention, each of the left and right actuators may include an array of switches such that the array of switches may be depressed in multiple locations using multiple positions of the hand. In one embodiment, the controller determines when a thumb-sized pattern of switches in a switch array is depressed. If a thumb-sized pattern of switches has been depressed, then the controller will recognize the corresponding actuator as being in the "on" position. In still further embodiments, an audible signal may be emitted and/or a dash light turned on when an activated actuator is depressed.

The present invention also provides an integrated motor vehicle equipment component control system for use with a motor vehicle steering wheel having an annular ring and a motor vehicle equipment component having a function. The integrated motor vehicle equipment component control system comprises a left actuator, the left actuator attached to the steering wheel annular ring between the 9 o'clock and 12 o'clock positions on the annular ring; a right actuator, the right actuator attached to the steering wheel annular ring between the 3 o'clock and 12 o'clock positions on the annular ring; and a controller, the controller connected to the left and right actuators, the controller further connected to a motor vehicle component such as radio, compact disc player, connected device, cellular telephone and navigation system, and other components. The left actuator and the right actuator do not overlap and the controller activates the left actuator and the right actuator when the left and the right actuators are depressed simultaneously and held for a pre-set threshold time. The function of the motor vehicle equipment component is activated when an actuator is depressed, the actuator selected from the group consisting of the left actuator and the right actuator.

The integrated motor vehicle equipment component control system of the present invention may further include actuators, the actuators each including a switch array.

The present invention also provides an integrated motor vehicle equipment component control system having a controller that activates left and right actuators when thumb-sized patterns of switches in a switch array located in of each of the left and the right actuators are simultaneously depressed.

The present invention still further provides an integrated motor vehicle equipment component control system for a motor vehicle having a steering wheel and having a left and right actuator such that the left actuator is preferably positioned beginning at the 11 o'clock position on the steering wheel annular ring and preferably extends in a two inch arc towards the 9 o'clock position and such that the right actuator is preferably positioned beginning at the 1 o'clock position on the steering wheel annular ring and preferably extends in a two inch arc towards the 3 o'clock position.

The present invention also provides an integrated motor vehicle equipment component control system having a left and right actuator such that the left and/or right actuators causes the controller to control a motor vehicle equipment component or, optionally, the controller sends a signal to an interface controller which controls a motor vehicle equipment component and wherein the motor vehicle equipment component could be one or more of a sound system, an entertainment system, a radio, a compact disc player, a connected device, a cellular telephone, a navigation system, an internet access system, BLUETOOTH system, and other motor vehicle components.

BRIEF DESCRIPTION OF THE DRAWINGS

FIG. 13 is a diagram of an embodiment of the system of the present invention showing a steering wheel, controller, and motor vehicle transmission.

FIG. 14 is a logic diagram of an embodiment of the system of the present invention showing a steering wheel, controller, interface controller and equipment component.

DETAILED DESCRIPTION OF THE INVENTION

Figure 1A:
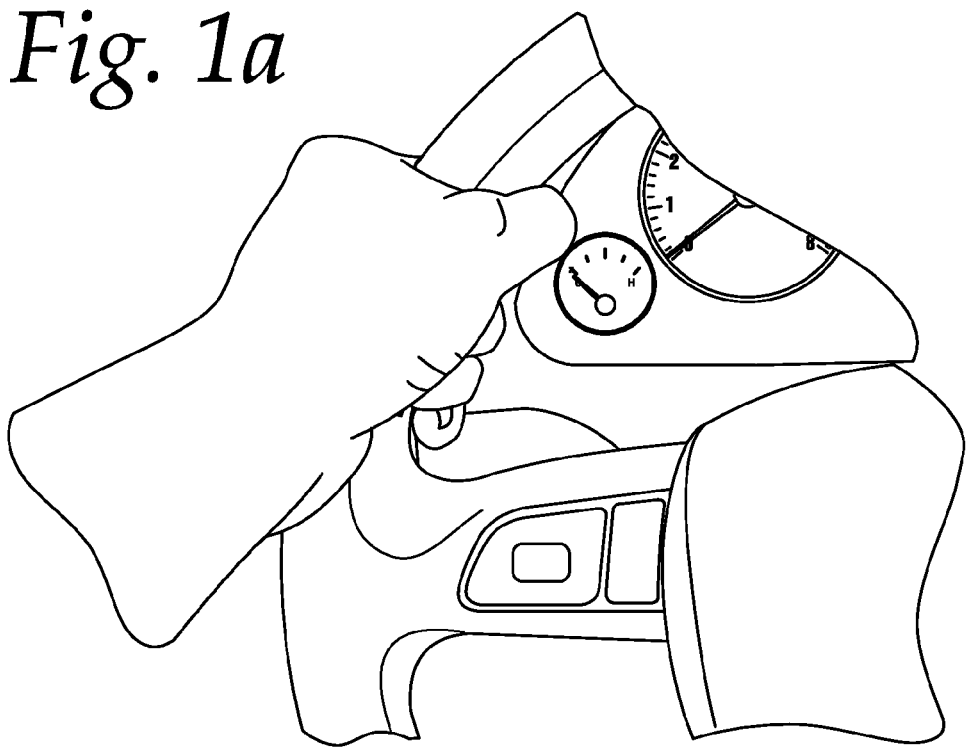
FIG. 1a is an illustration of a driver's hand gripping a steering wheel in a four-fingered grip.
Figure 1B:
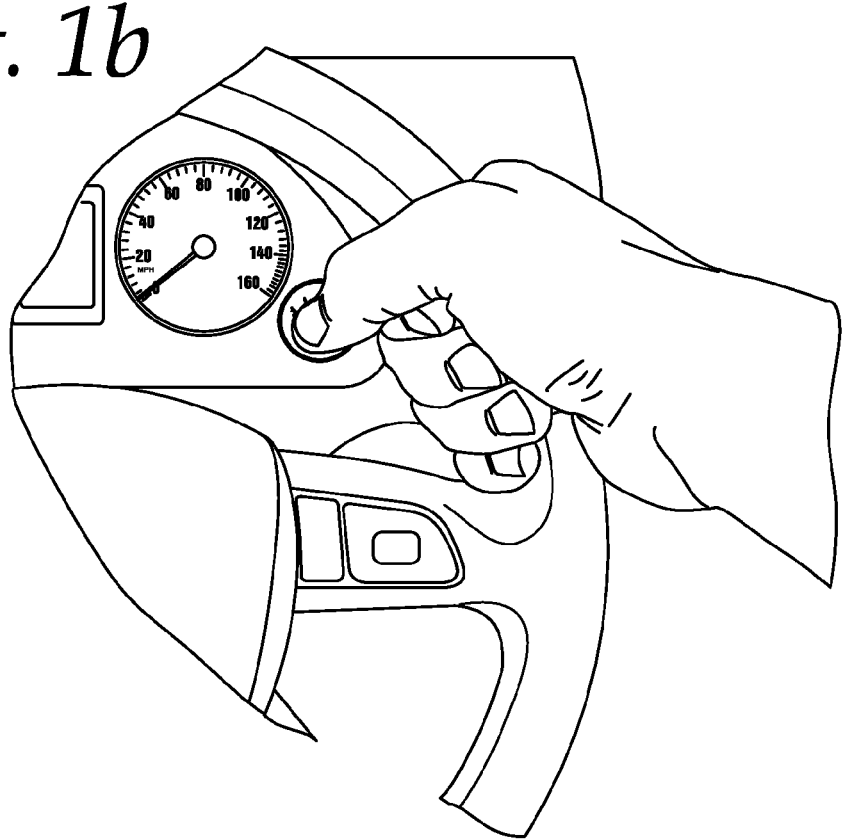
FIG. 1b is a further illustration of a driver's hand gripping a steering wheel in a four-fingered grip.

It is generally desirable, if not advisable, for a driver to grip a steering wheel of a motor vehicle in a four-fingered grip with the fingers of the hand wrapped around the rim of the steering wheel when driving the motor vehicle. The four-fingered grip is illustrated in FIGS. 1a and 1b. Such a four-fingered grip securely positions the steering wheel in a driver's hands. Embodiments of the present invention are directed towards allowing a driver to maintain a four-fingered grip on the steering wheel while operating the vehicle's turn signals or other mechanical components of the motor vehicle via a computer-driver interface, such components including a radio, a compact disc player, a cellular telephone, a navigation system, an internet access system, BLUETOOTH system, and other motor vehicle components.

Figure 2:
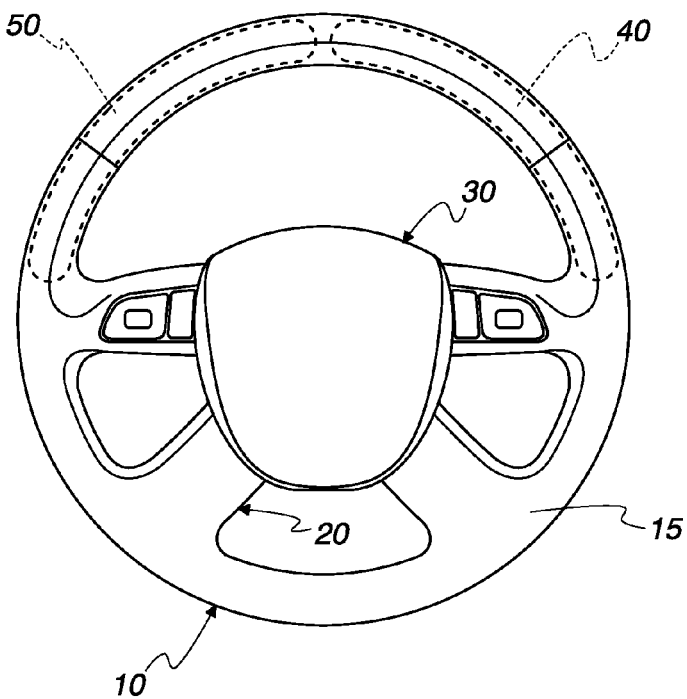
FIG. 2 is an illustration of a steering wheel of an embodiment of the present invention.

In one embodiment, the present invention provides a system which permits the controlled operation of a motor vehicle's turn signals without a driver being required to loosen or remove a fully-wrapped four-fingered grip on the steering wheel. As addressed more fully below, other embodiments provide a computer-driver interface which facilitates operation of a motor vehicle's equipment components and mechanical functions and which may be programmed as to which functions are operated. The system of the embodiments of the present invention, referring now to FIG. 2, would include switches, sensors or gages, collectively actuators, integrally mounted to a steering wheel 10. As shown in FIG. 2, actuators 40, 50 may be proximal to each other, but actuators 40, 50 do not overlap. The steering wheel 10 of the present embodiment includes an annular ring 15 which may be connected to a hub 30 by one or more spokes 20. Other configurations of a steering wheel will be known to those of ordinary skill in the art.

Figure 3:
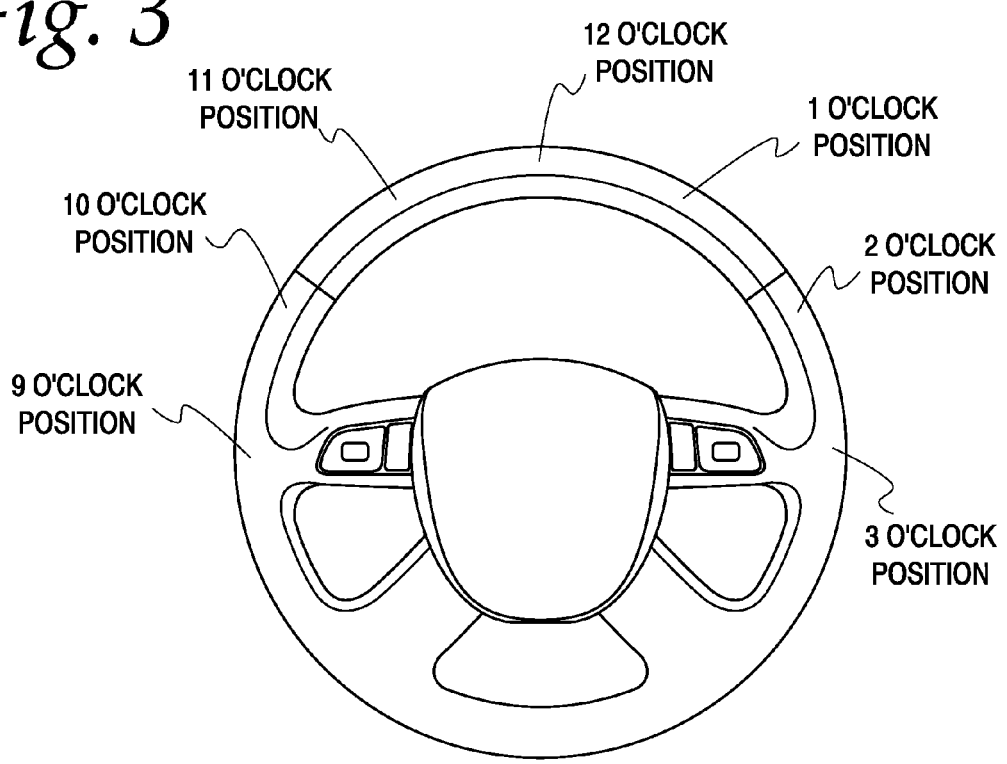
FIG. 3 is an illustration of the clock positions designating locations on a steering wheel.

Referring now to FIG. 3, the upper half of annular ring 15 of steering wheel 10 may be designated by the clock positions from 3 o'clock on the right-hand side of steering wheel 10 through 9 o'clock on the left-hand side of steering wheel 10. As also shown in FIG. 2, actuator 40 may be positioned to cover a portion of steering wheel 10 between the 3 o'clock position and the 12 o'clock position. Similarly, actuator 50 may be positioned to cover a portion of steering wheel 10 between the 9 o'clock position and the 12 o'clock position. When actuators 40, 50 are so positioned they may abut, but do not overlap. Accordingly, in one embodiment the left actuator is positioned proximal to the 9 o'clock position on the steering wheel annular ring and the opposite end of the left actuator is positioned proximal to the 12 o'clock position on the steering wheel annular ring, such that the left actuator is sized to span the distance between the 9 o'clock and 12 o'clock positions. A standard-sized steering wheel has a diameter of approximately 15 inches. Therefore the circumferential segment of annular ring 15, or the "arc-segment-length," from the 3 o'clock position to the 12 o'clock position has a length of about 12 inches. Similarly, the arc-segment-length from the 9 o'clock position to the 12 o'clock position also has a length of about 12 inches.

Figure 4:
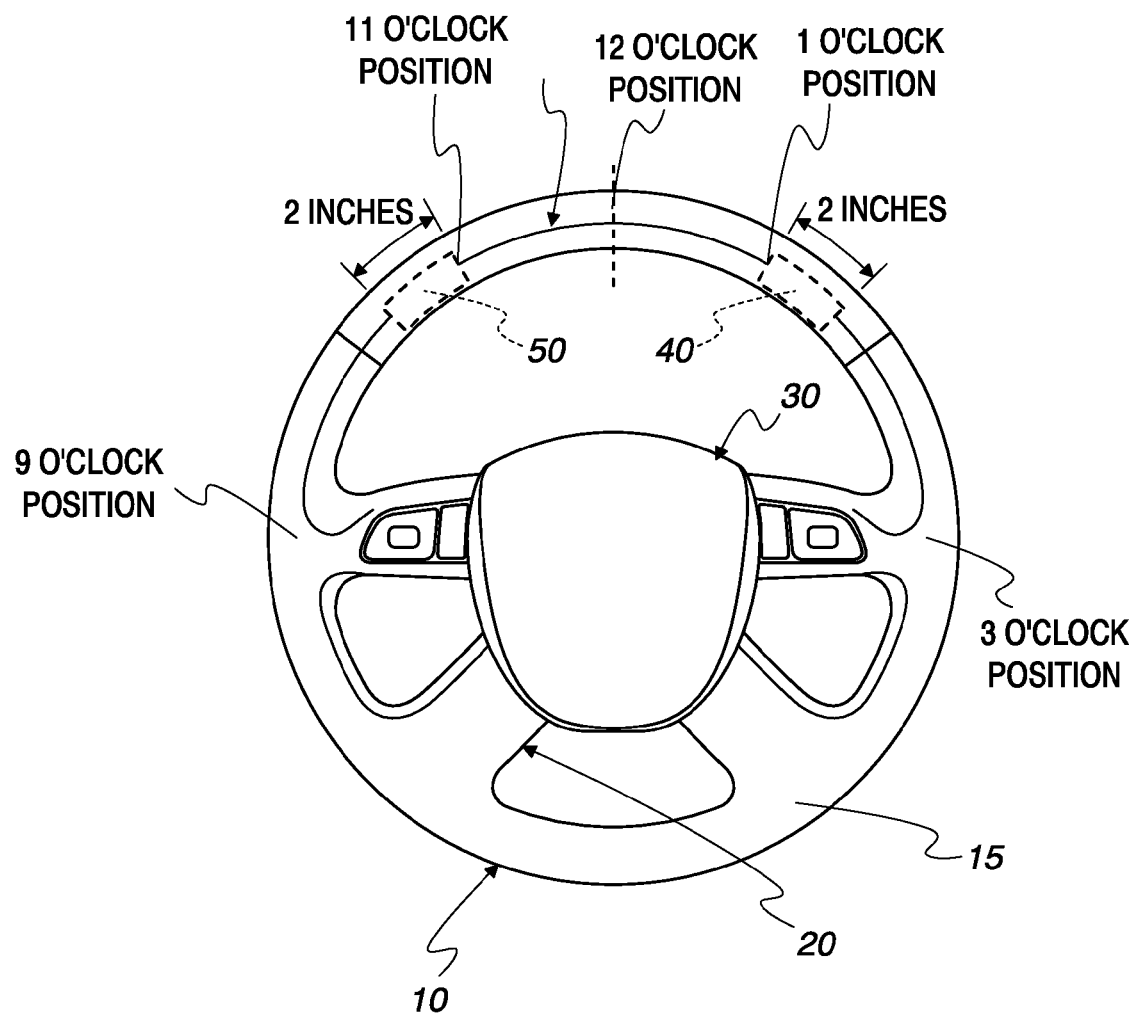
FIG. 4 is an illustration of a steering wheel of an embodiment of the present invention showing a preferred actuator location.

Actuators 40, 50 may be sized to cover the entire arc-segment-length between the 3 o'clock and 12 o'clock positions and the 9 o'clock and 12 o'clock positions, respectively, as described above. Alternatively, actuators 40, 50 may be sized to cover only a portion of the arc-segment-length between the 3 o'clock and 12 o'clock positions and the 9 o'clock and 12 o'clock positions, respectively. As shown in FIG. 4, one preferred size and location for actuators 40, 50 is an arc-segment-length of 2 inches with actuators 40, 50 covering a portion of annular ring 15 of steering wheel 10 ending at about the 1 o'clock and 11 o'clock positions respectively such that actuator 50 extends counterclockwise towards the 9 o'clock position and actuator 40 extends clockwise towards the 3 o'clock position.

Figure 5:
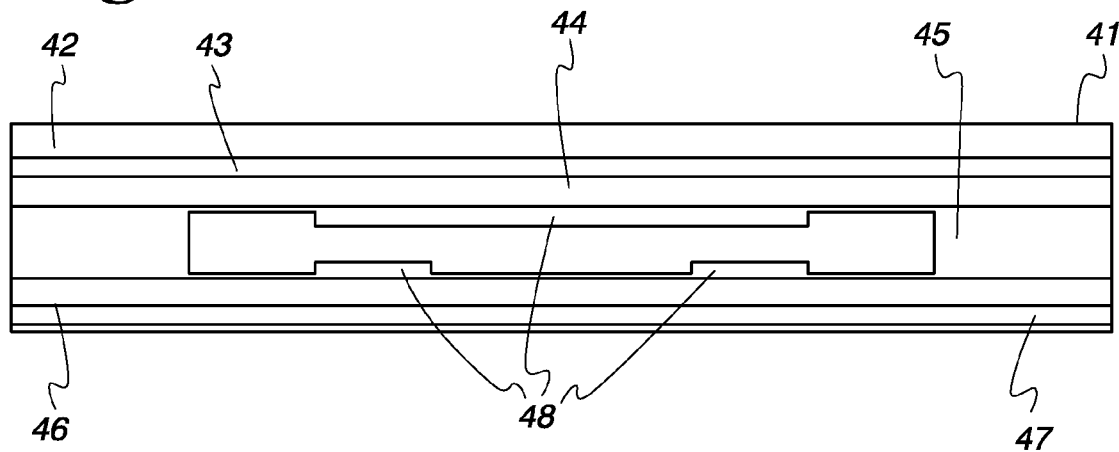
FIG. 5 is an illustration of one preferred actuator design of the present invention.

Actuators 40, 50 of the present invention may be membrane switches of a type manufactured by Tapecon, Inc., Tapecon Membrane Switch Division, Rochester, N.Y. Membrane switches, as is known in the art, may be manufactured in variety of configurations each of which are single pole, single throw switches which are normally open. Membrane switch configurations include a standard membrane switch construction, a tactile plastic dome construction and a stainless steel dome construction. FIG. 5 illustrates one type of membrane switch 41 which includes top overlay 42, adhesive layer 43, top circuit 44, circuit spacer 45, bottom circuit 46, bottom overlay 47 and contacts 48. Membrane switch 41 is normally open. When top overlay 42 is depressed, top circuit 44 is flexed so that a circuit is completed at contacts 48. Depending on the arc-segment-length, as described above, actuators 40, 50 may each include one or more membrane switches. Membrane switch arrays, which cover a larger area than a single membrane switch, are taught, for example, in WO1995001302, titled "Curve-conforming Sensor Array Pad." Actuators 40, 50 may be a fiber optic pressure sensor, or an array of fiber optic pressure sensors, of the type manufactured by Luna Innovations, Blacksburg, Va. Alternatively, actuators 40, 50 may be a large-area flexible pressure sensor matrix of the type developed by the Quantum-Phase Electronics Center, School of Engineering, University of Tokyo, Tokyo, Japan and described in "A Large-Area, Flexible Pressure Sensor Matrix With Organic Field-Effect Transistors For Artificial Skin Applications," T. Someya et al., PNAS, vol. 101, no. 27, Jul. 6, 2004. Furthermore, actuators 40, 50 may be a flexible strain gage of a type available from Omega Engineering, Inc., Stamford, Conn.

The actuators 40, 50 may be mechanically bonded to the steering wheel, such as by thermal or sonic welding if the materials of construction of the actuators 40, 50 and the steering wheel 10 are compatible and susceptible to such attachment. The actuators 40, 50 may be attached to the steering wheel 10 using an adhesive. The actuators 40, 50 when attached to the steering wheel 10 may be covered by a cover or skin (not shown) so that the actuators 40, 50 reside under the skin of the steering wheel 10. Actuators 40, 50 can be positioned under the skin of the steering wheel 10 so as to make the actuators 40, 50 undetectable by the human eye. The actuators 40, 50 may be molded into the steering wheel 10 during the process of manufacturing the steering wheel 10. When molded into the steering wheel 10, the actuators may be positioned under the surface of the steering wheel 10 if the material of construction of the steering wheel 10 is sufficiently deformable to permit deforming the steering wheel 10 in a manner that also allows activating the actuators 40, 50.

The properties of the material of construction of a steering wheel 10 will be known to those of ordinary skill in the art such that the permissible methods for attachment of actuators 40, 50 to the steering wheel 10 will be also be understood. For example, it is known in the art that steering wheels may be molded from a pliable cross-linked vinyl chloride polymer as taught in U.S. Pat. No. 4,567,217 to Yamazaki et al. It is further understood in the art that flexible sensors, such as membrane switches, may be encapsulated in a molded part as taught in U.S. Pat. No. 5,762,853 to Harris et al. Also, insert molded membrane switches have been used as steering wheel hub-mounted horn switches as taught in U.S. Pat. No. 5,198,629 to Hayashi et al.

Figure 6:
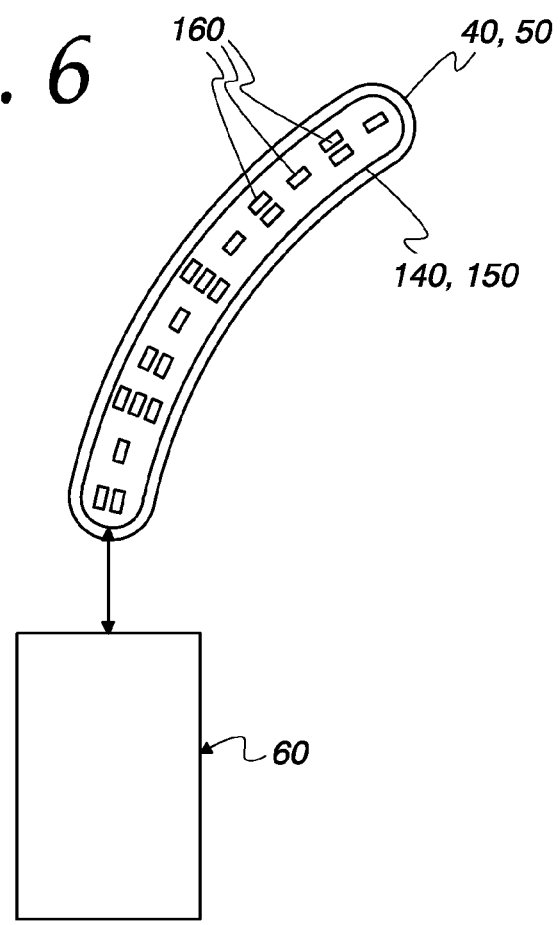
FIG. 6 is an illustration of an embodiment of the present invention in which an actuator includes a plurality of switches in a switch array.

To accommodate different hand positions used by a driver during operation of a vehicle, actuators 40, 50 may be configured to sense when the thumb of a hand is pressing one or both of the actuators 40, 50. FIG. 6 illustrates one design in which each of actuators 40, 50 are made up of switch arrays 140, 150, respectively, and where the switch arrays 140, 150 each include a plurality of switches 160. The switch array 140, 150 of FIG. 6 is merely illustrative and does not depict a necessary configuration of switches 160. The switches 160 are normally open (off), closed when depressed or selected (on), and return to open (off) when deselected. Each of switches 160 is connected to a controller 60 so that controller 60 may sense when a switch 160 is in the open position or the closed position. Switches 160 may be connected to controller 60 via a wiring harness (not shown) for example, such that each switch 160 is wired to a terminal block (not shown) and the terminal block is wired to the controller 60 via the wiring harness. Those of ordinary skill in the art will recognize other connection means for wiring switches 160 to controller 60. The activation state of each switch 160 in switch arrays 140, 150, that is to say whether a switch 160 is on or off, may be determined by the controller 60. In a typical operation, a switch 160 opens and closes an electrical circuit between the switch 160 and the controller 60. If only switches 160 corresponding to a thumb-sized pattern are depressed, then the actuators 40, 50 will be recognized as being in the "on" position by the controller 60. However, if switches 160 corresponding to a pattern larger than a thumb are depressed, then actuators 40, 50 will be recognized as being in the "off" position.

In the embodiments of the present invention which incorporate actuators 40, 50 as illustrated in FIG. 6, the controller 60 is programmed to determine when switches 160 are depressed in a thumb-sized pattern. As used herein, a thumb-sized pattern means an area that ranges from about 0.5 square inches to about 2.25 square inches. Thus, if a full four-fingered grip is taken of steering wheel 10 a pattern of switches 160 may be depressed, depending on where the driver places his or her hand on the steering wheel, which exceeds the size of the pattern of switches made when a thumb depresses one of actuators 40, 50. Under this condition, controller 60 does not activate actuators 40, 50 and controller 60 recognizes actuators 40, 50 as being in the "off" position. However, if a thumb is then placed on either actuator 40 or actuator 50, controller 60 registers that a thumb-sized pattern of switches has been depressed and controller 60 recognizes either actuator 40 or actuator 50, respectively, as being in the "on" position. Once actuators 40, 50 are activated via controller 60, either actuator 40 or actuator 50 may be depressed to turn on the corresponding signal lights (not shown) or operate the corresponding vehicle equipment component or function, such as a radio, compact disc player, cellular telephone or navigation system (not shown). Once activated, simultaneously pressing actuator 40 and actuator 50 will not turn on the corresponding turn signal lights. If controller 60 has not activated actuators 40, 50, then depressing either actuator 40 or actuator 50 will not turn on the corresponding turn signal lights or operate the corresponding vehicle function. It will be understood by those of ordinary skill in the art that a motor vehicle equipment component will have at least one function, being turned on/off for example, but may also have a plurality of functions.

In one embodiment, pressing an activated actuator 40 or an activated actuator 50 will turn on an audible signal in addition to turning on the corresponding turn signal lights or equipment component. The audible signal may serve to indicate to the driver that the turn signal has been turned on. The audible signal may also serve to indicate that the actuators 40, 50 have become activated. In one embodiment, the audible signal may emanate from the speaker system of the motor vehicle that is used, for example, to signal that a car door is open when the ignition key remains in the ignition switch. In another embodiment, the audible signal may emanate from the same sound source used to alert a driver of the motor vehicle that the stalk-switch-operated turn signal has been turned on. In another embodiment, the audible signal may be wirelessly broadcast using BLUETOOTH technology such that the audible signal is received in an ear piece or headset worn by the driver and the driver thereby hears the audible signal. In yet another embodiment, actuators 40, 50 may be connected to corresponding turn signal indicator lights located in the dashboard of the motor vehicle such that pressing an activated actuator 40 or an activated actuator 50 will light the corresponding turn signal indicator lights. BLUETOOTH technology or, alternatively BLUETOOTH system refers to a proprietary open wireless technology standard for exchanging data over short distances (using short-wavelength radio transmissions in the ISM band from 2400-2480 MHz) from fixed and mobile devices, creating personal area networks with high levels of security. BLUETOOTH technology and systems are available from Bluetooth Sig, Inc., Lake Washington Boulevard, Kirkland, Wash.

Figure 7:
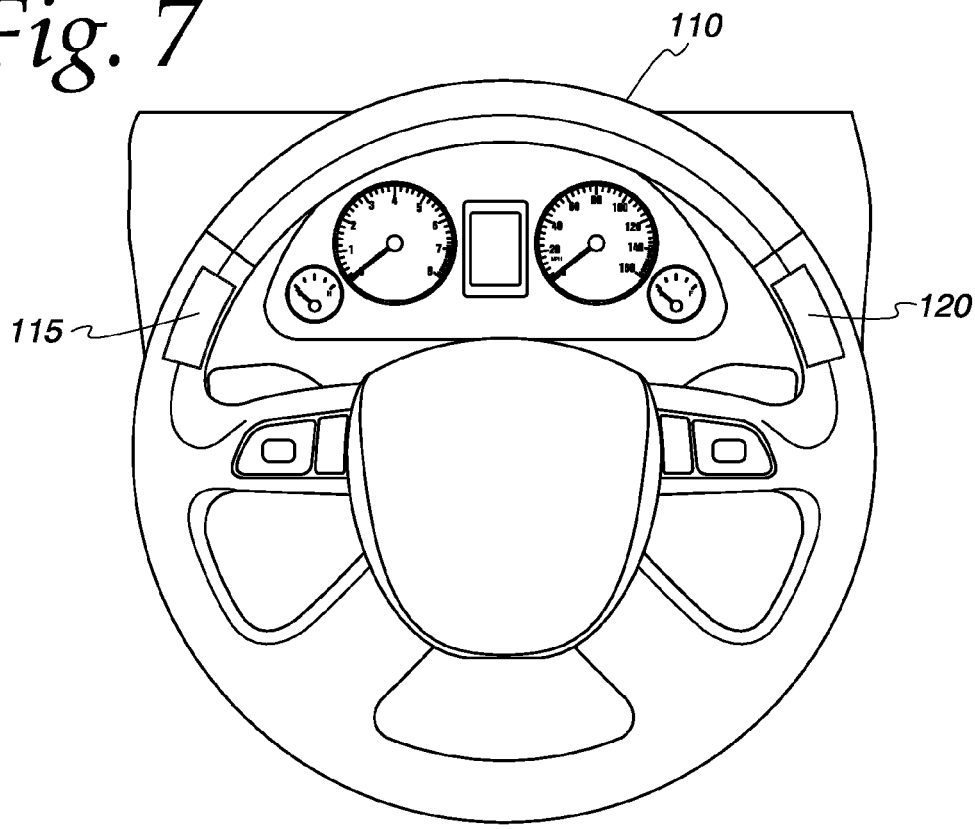
FIG. 7 is an illustration of a steering wheel of the prior art illustrating the position of the steering wheel-mounted turn signal switches.
Figure 8A:
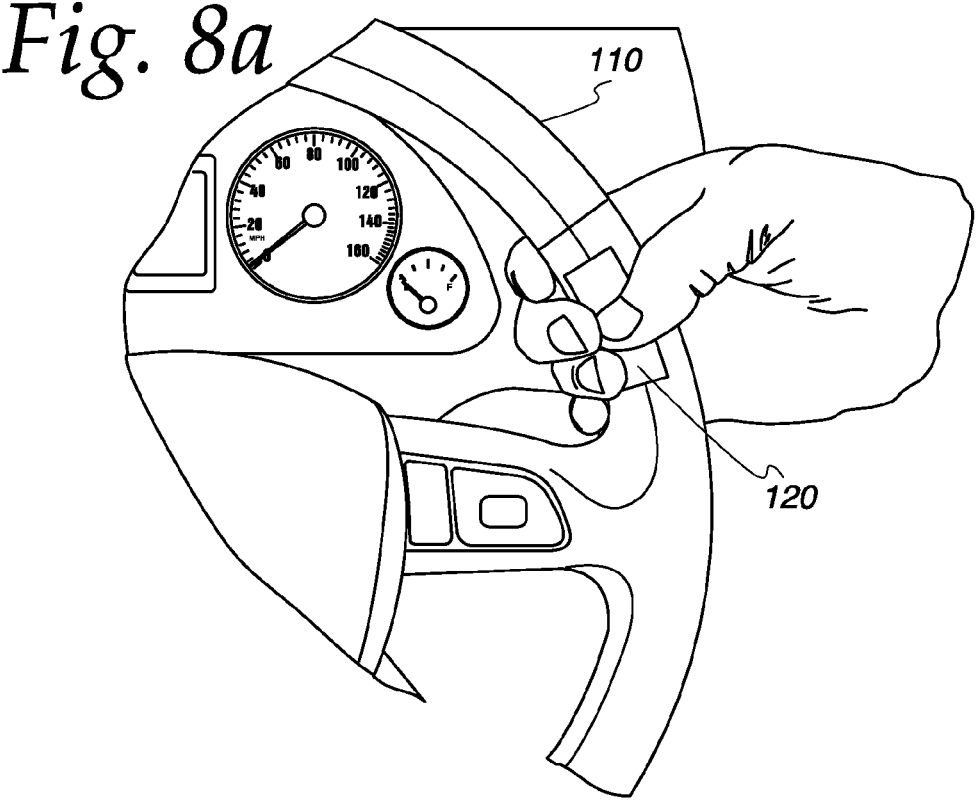
FIG. 8a is an illustration of a driver gripping the prior art steering wheel of FIG. 7 illustrating the position of the driver's hand relative to steering wheel-mounted turn signal switches.
Figure 8B:
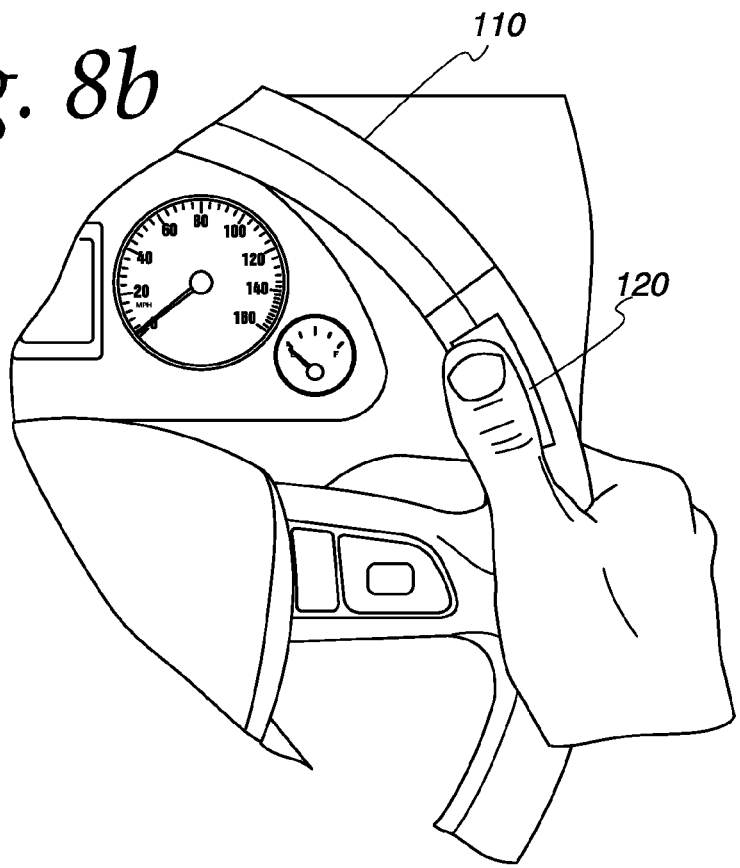
FIG. 8b is a further illustration of a driver gripping the prior art steering wheel of FIG. 7 illustrating the position of the driver's hand relative to steering wheel-mounted turn signal switches.
Figure 8C:
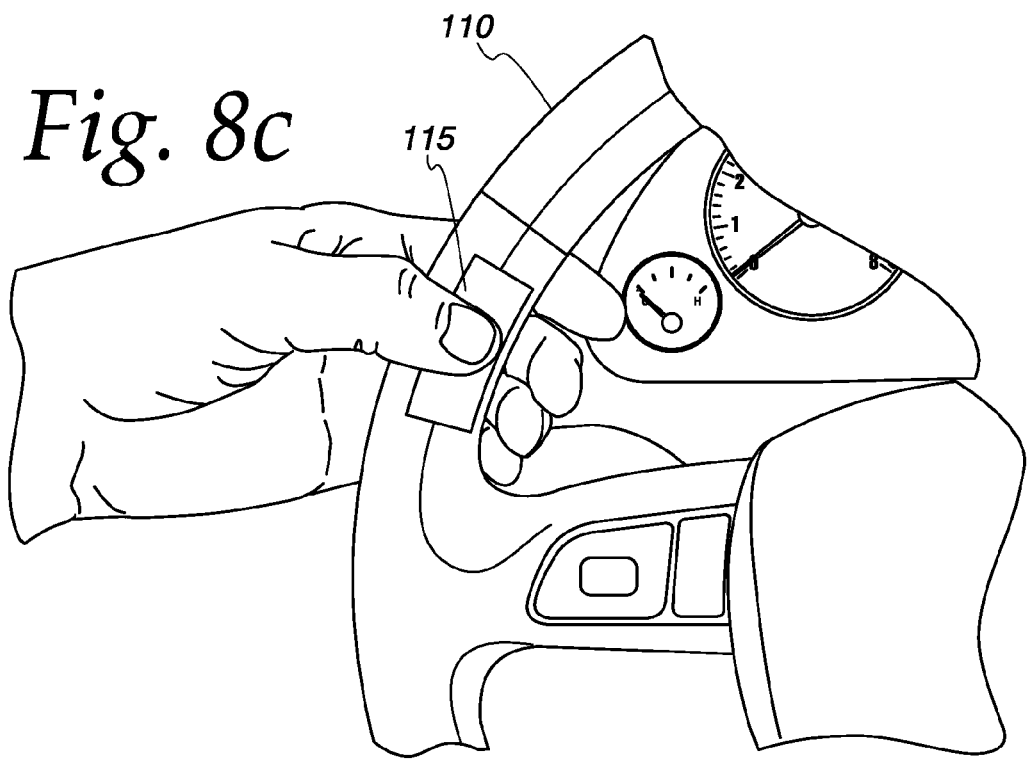
FIG. 8c is yet a further illustration of a driver gripping the prior art steering wheel of FIG. 7 illustrating the position of the driver's hand relative to steering wheel-mounted turn signal switches.
Figure 8D:
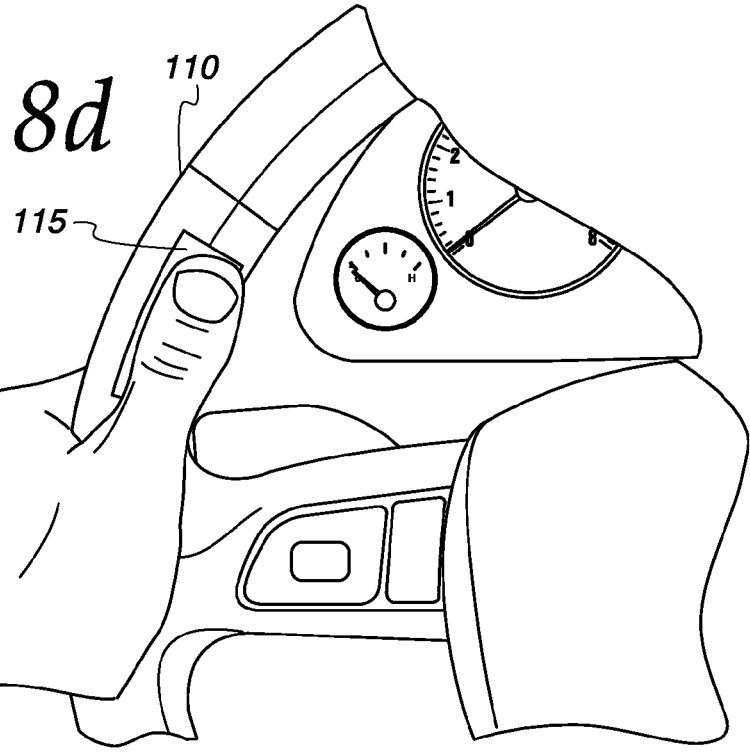
FIG. 8d is still a further illustration of a driver gripping the prior art steering wheel of FIG. 7 illustrating the position of the driver's hand relative to steering wheel-mounted turn signal switches.

FIG. 7 illustrates a steering wheel 110 of the prior art and FIGS. 8a-8d illustrate a driver's hands gripping the steering wheel 110 of FIG. 7. In FIG. 7, hot buttons 115, 120 are depicted positioned on the steering wheel 110 as described in the prior art. As used herein, the term "hot button" refers to a single on/off switch which is pressed to turn on and pressed again to turn off. Thus, hot buttons 115, 120 are placed at the 10 o'clock and 2 o'clock positions on the steering wheel 110, respectively. Referring to FIG. 8a, it is clear that the four-fingered grip of the driver must be loosened, thus not fully gripping steering 110, in order to rotate the thumb into position to depress hot button 115. In FIG. 8b, the driver must again modify the four-fingered grip to accommodate the spoke 125 in order to access and depress hot button 115. In FIG. 8c, it is again clear that the four-fingered grip of the driver must be loosened, thus not fully gripping steering 110, in order to rotate the thumb into position to depress hot button 120. As was seen in FIG. 8b, FIG. 8d illustrates how the driver must modify the four-fingered grip to accommodate the spoke 125 in order to access and depress hot button 120.

Figure 9A:
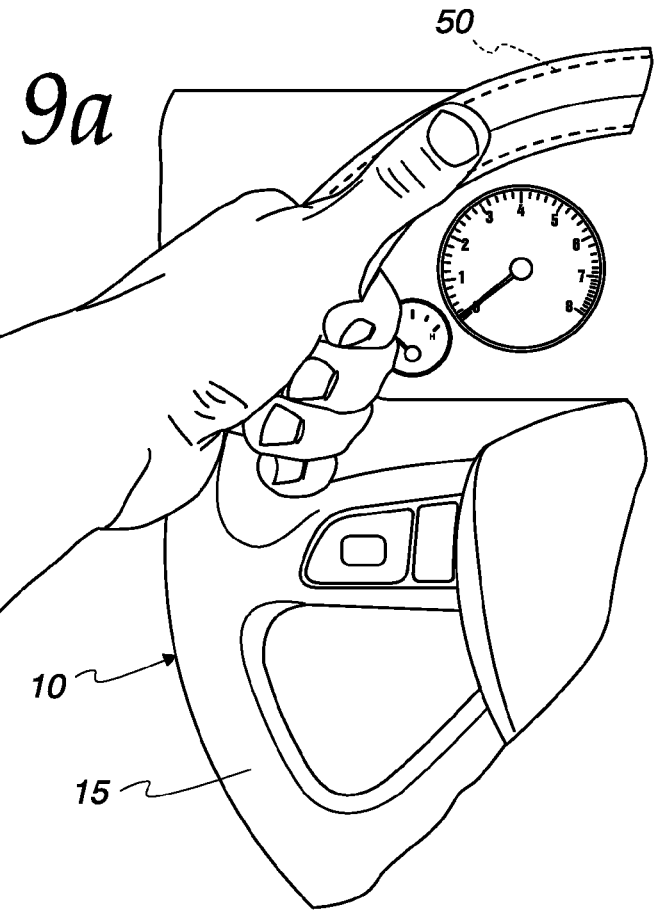
FIG. 9a illustrates a driver gripping the steering wheel of the present invention while maintaining a four-fingered grip and activating the actuator.
Figure 9B:
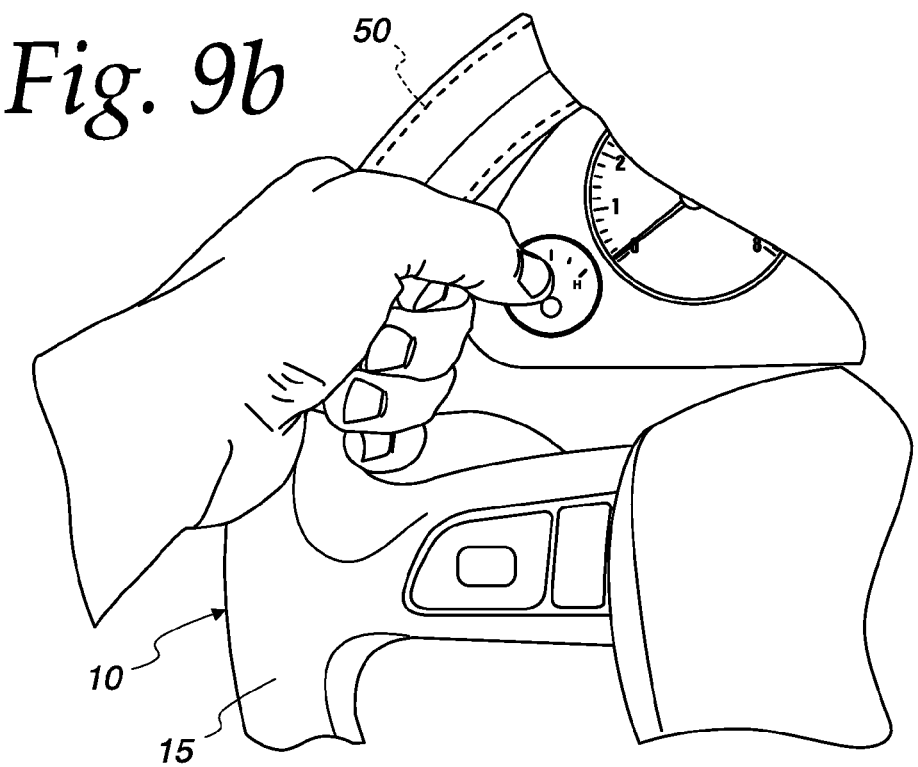
FIG. 9b illustrates a driver gripping a steering wheel of the present invention in a four-fingered grip.
Figure 9C:
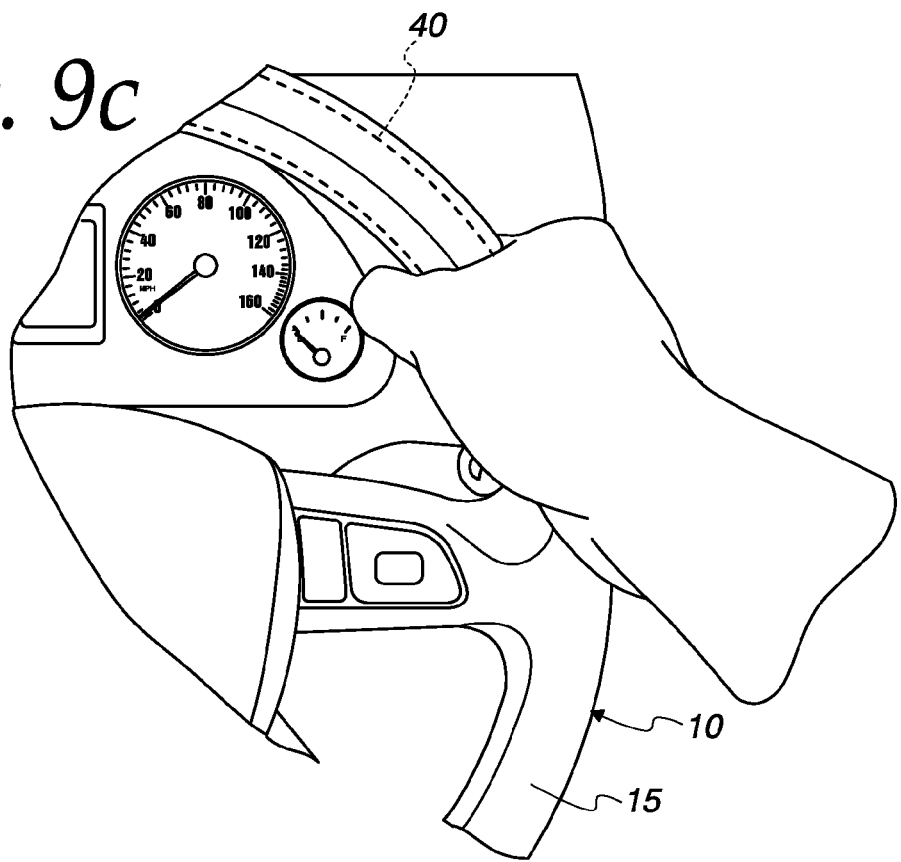
FIG. 9c illustrates another view of a driver gripping the steering wheel of the present invention in a four-fingered grip.
Figure 9D:
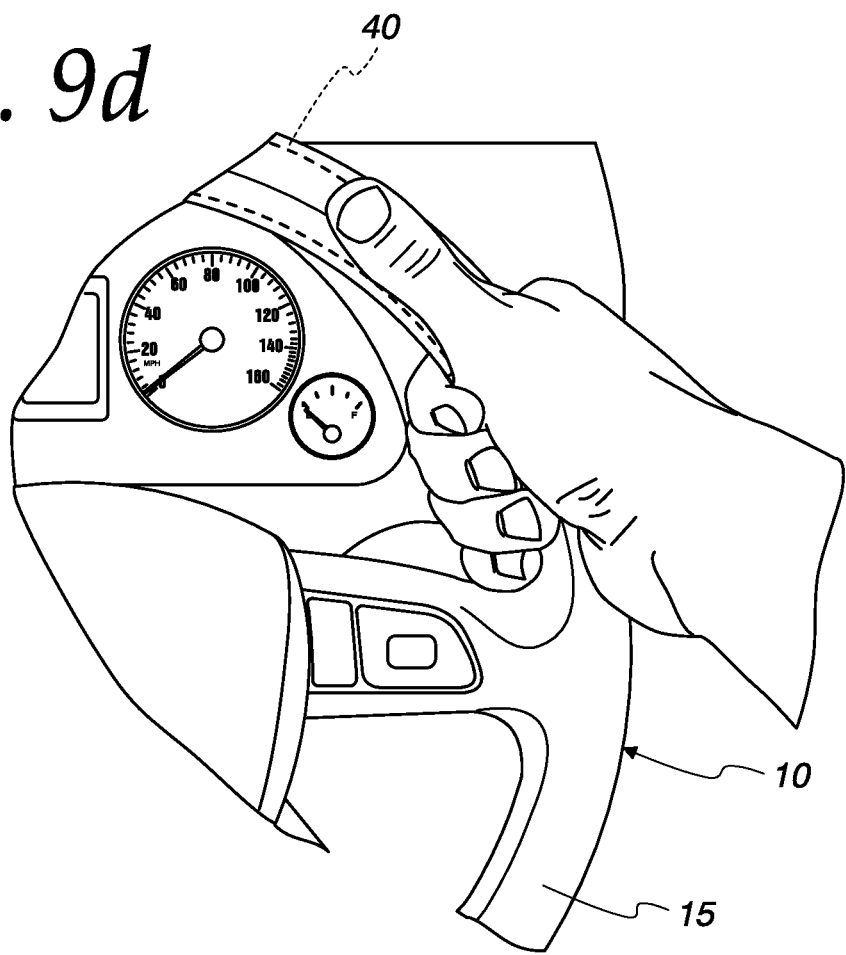
FIG. 9d illustrates a driver gripping the steering wheel of the present invention while maintaining a four-fingered grip and activating the actuator.

In one embodiment, actuators 40, 50 are preferably positioned on annular ring 15 of steering wheel 10 facing the driver. When positioned in this location, actuators 40, 50 may be activated when the driver presses down on the steering wheel using a thumb of the driver's left or right hands. FIGS. 9a-9d illustrate a driver gripping annular ring 15 of steering wheel 10 with the driver's thumb position in a full four-fingered grip ((FIGS. 9b and 9c) and with the thumb positioned over actuators 40, 50 (FIGS. 9a and 9d). It will be recognized by persons of ordinary skill in the art that actuators 40, 50 may be positioned in locations other than on the side of annular ring 15 directly facing the driver.

Figure 10:
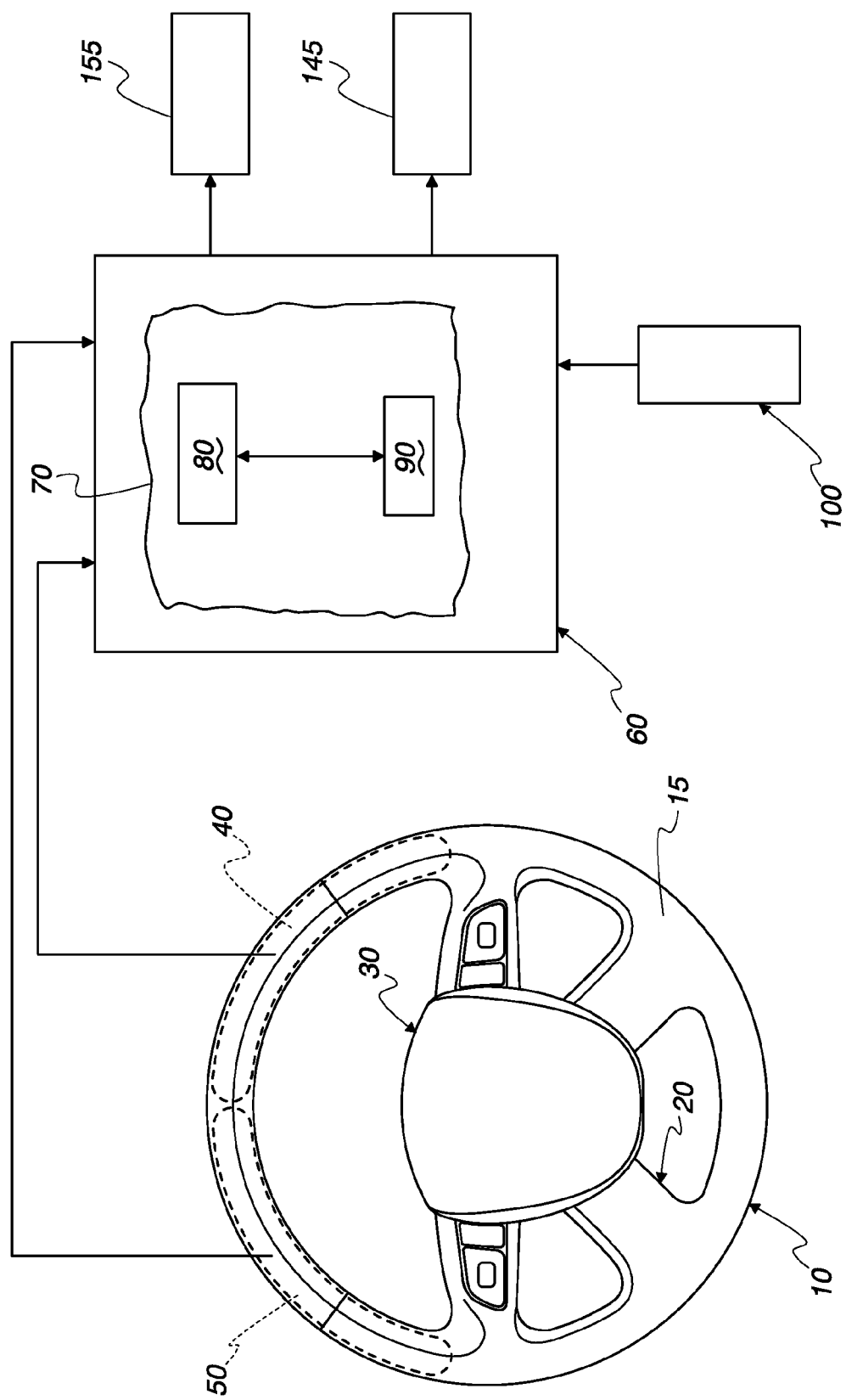
FIG. 10 is a diagram of an embodiment of the system of the present invention showing a steering wheel, controller, stalk switch and actuator circuits.

Referring now to FIG. 10 which illustrates an embodiment of the present invention, actuators 40, 50 are connected to controller 60. Controller 60 includes processor 70. Processor 70 includes logic circuits 80, timer 90 and memory 100. Controller 60 is connected to right-side signal circuit 145 and left-side signal circuit 155. Right-side signal circuit 145 includes right-side signal lights (not shown) and left-side signal circuit (155) includes left-side signal lights (not shown). Turn signal stalk switch (not shown) may also be connected to controller 60. Alternately, as further described herein below, actuators 40, 50 and controller 60 may be used with other motor vehicle equipment or systems to operate an equipment component or to allow actuators 40, 50 to function as thumb shifters.

In an embodiment of the present invention, controller 60 controls the operation of actuators 40, 50 such that when actuator 40 is depressed, right side signal lights (not shown) of right-side signal circuit 145 are energized and when actuator 50 is depressed, left-side signal lights (not shown) of left-side signal circuit 155) are energized. When energized, right-side signal lights and/or left-side signal lights (not shown) may "blink" as is common to all turn signals.

Figure 11:
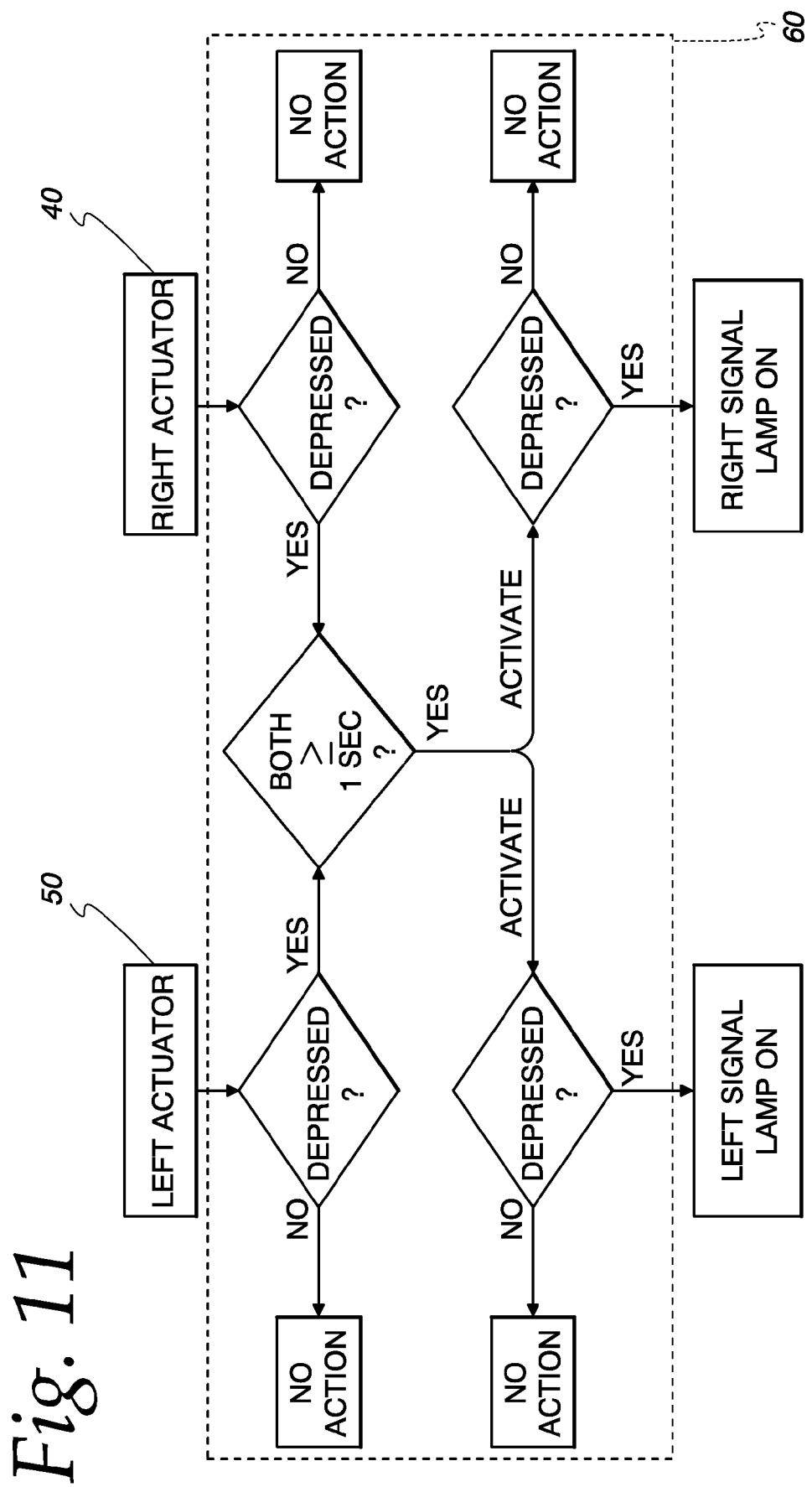
FIG. 11 is a logic diagram illustrating the operation of an embodiment of the present invention.

FIG. 11 illustrates the circuit logic of one embodiment of the present invention. In this embodiment, when actuator 40 is depressed it is in a closed position and it completes a circuit to controller 60. Similarly, when actuator 50 is depressed it completes a circuit to controller 60. If both actuator 40 and actuator 50 are depressed, controller 60 via timer 90 (shown in FIG. 10) measures the time each of actuator 40 and actuator 50 is depressed. If the measured time exceeds a pre-set threshold time, 1 second for example, then controller 60 activates actuators 40, 50. If the measured time is less than the pre-set threshold time, controller 60 does not activate actuators 40, 50. The pre-set threshold time can be varied and programmed into memory 100 shown in FIG. 10 such that logic circuits 80 of FIG. 10 in controller 60 activate actuators 40, 50. The pre-set threshold time may range from about 0.5 seconds to about 5 seconds. It is preferred that the pre-set threshold time be about 1 second. When activated, depressing actuator 40 results in the right side signal lights (not shown) of right-side signal circuit 145 to be energized and when actuator 50 is depressed left-side signal lights (not shown) of left-side signal circuit 155) are energized. When energized, right-side signal lamp and/or left-side signal lamp (not shown) may "blink" as is common to all turn signals.

Figure 12A:
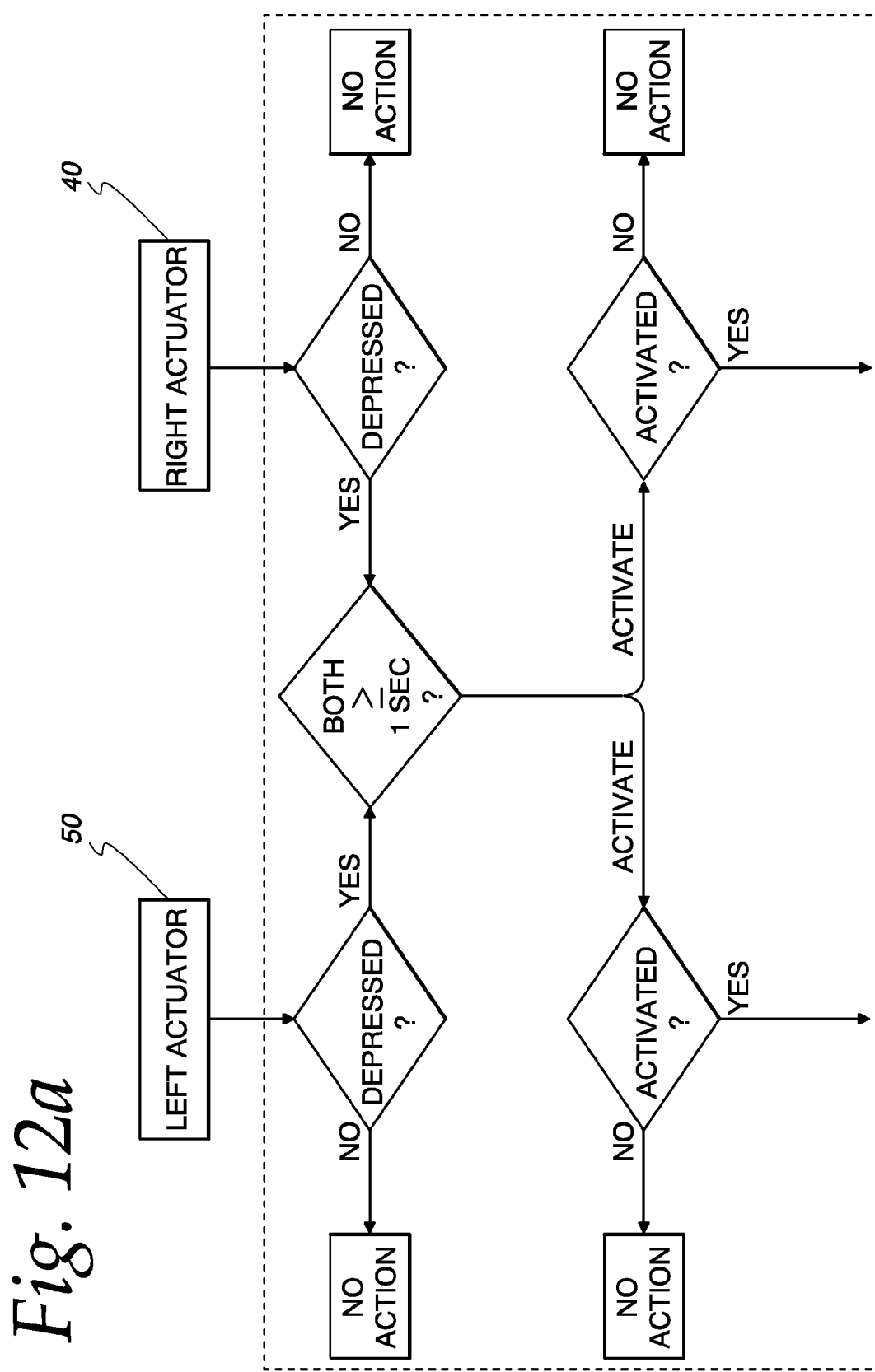
FIGS. 12a and 12b are a logic diagram illustrating the operation of an embodiment of the present invention in which a controller is used to determine when a thumb is pressing on a steering wheel to activate a turn signal.
Figure 12B:
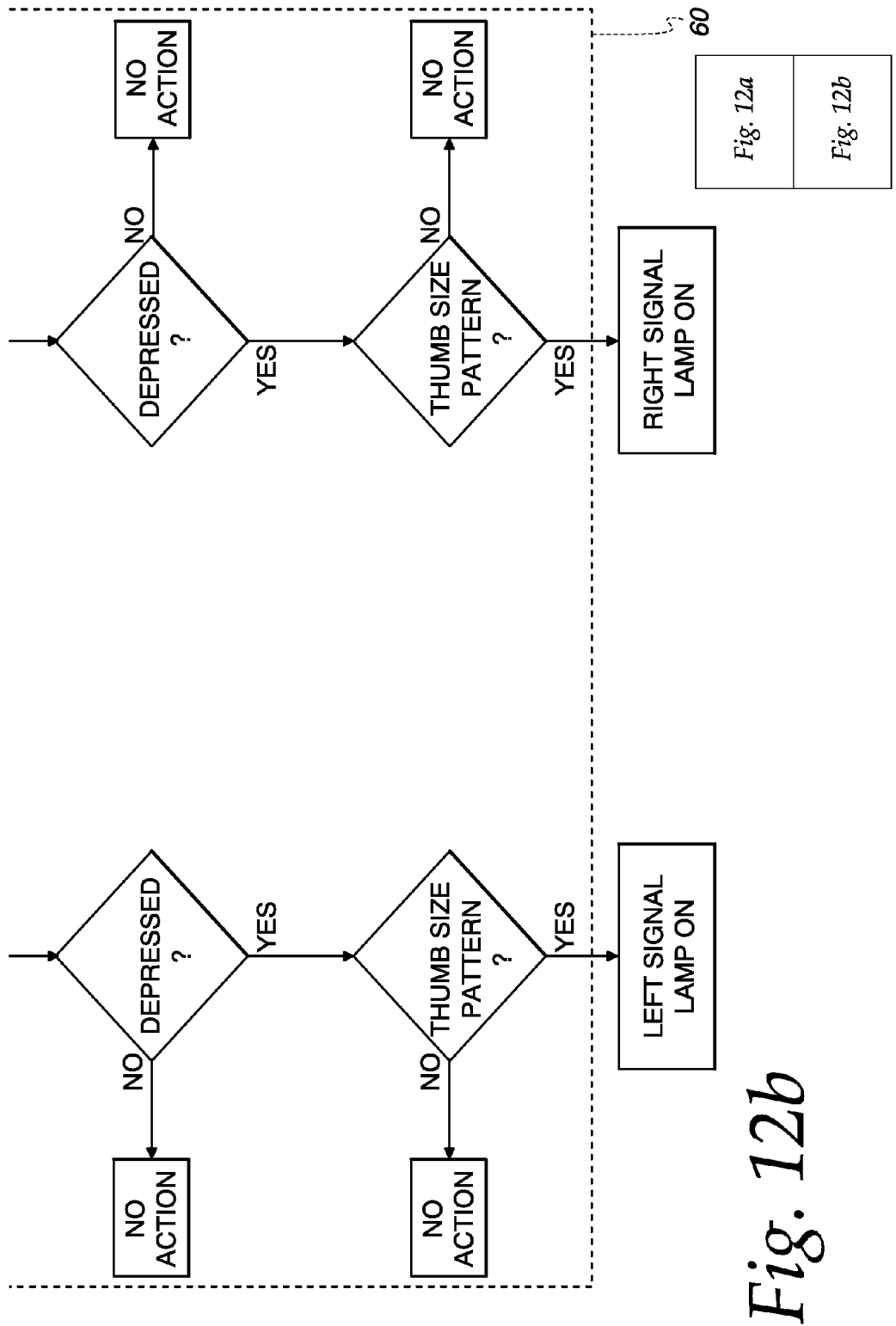

FIG. 12 (FIGS. 12a and 12b inclusive) illustrates the logic circuit of a further embodiment of the present invention in which actuators 40, 50 are of the type illustrated in FIG. 6. In this embodiment, actuator 40 and actuator 50 are each made up of switch arrays 140, 150, respectively, where each switch array 140, 150 includes a plurality of switches 160. The switches 160 are normally open (off), closed when depressed or selected (on), and return to open (off) when deselected. Each of switches 160 is connected to a controller 60 so that controller 60 may sense when a switch 160 is in the open position or the closed position. In a typical operation, a switch 160 opens and closes an electrical circuit between the switch 160 and the controller 60. If only switches 160 corresponding to a thumb pattern are depressed, then the actuators 40, 50 will be recognized as being "on" by the controller 60. However, if switches 160 corresponding to a pattern larger than a thumb-sized pattern are depressed, then actuators 40, 50 will be recognized as being "off." The controller 60 is programmed to determine when switches 160 are depressed in a thumb-sized pattern. Thus, if a full four-fingered grip is taken of steering wheel 10 a pattern of switches 160 may be depressed, depending on where the driver places his or her hand on the steering wheel, which exceeds the size of the thumb-sized pattern made when a thumb depresses actuators 40, 50. Under this condition, controller 60 does not activate actuators 40, 50 and controller 60 recognizes actuators 40, 50 as being in the "off" position. However, if a thumb is then placed on actuators 40, 50, controller 60 registers that a thumb-sized pattern of switches has been depressed and controller 60 will activate the actuators 40, 50 if they are depressed for at least the pre-set threshold time. When controller 60 activates actuators 40, 50, either one of actuator 40 or actuator 50 may be depressed to turn on the corresponding signal lights (not shown), or to operate a motor vehicle equipment component, as described herein below, or to operate as a thumb shifter, as also described herein below. If controller 60 has not activated actuators 40, 50, then depressing either of actuator 40 or actuator 50 will not turn on the corresponding signal lights, operate as an equipment component, or act as a thumb shifter.

To deactivate actuators 40, 50, both actuator 40 and actuator 50 are depressed simultaneously and held for a pre-set threshold time. Referring to FIG. 10, timer 90 of controller 60 measures the time each of actuator 40 and actuator 50 is depressed. If the measured time exceeds a pre-set threshold time, 1 second for example, then controller 60 deactivates the activated actuators 40, 50. If the measured time is less than the pre-set threshold time, controller 60 does not deactivate actuators 40, 50. The pre-set threshold time can be varied and programmed into memory 100 shown in FIG. 10 such that logic circuits 80 of FIG. 10 in controller 60 deactivate activated actuators 40, 50. It is preferred that the pre-set threshold time be about 1 second. When actuators 40, 50 are deactivated, depressing actuators 40, 50 will not turn on the corresponding turn signal lights, equipment component or function as paddle shifters.

When driving a motor vehicle equipped with a steering wheel that incorporates the present invention, a driver may use the vehicle's stalk switch to turn on the vehicle's turn signals. Preferably the operation of the stalk switch is not modified by incorporation of the present invention into the steering wheel, but modifications may be made without altering the concepts encompassed by the descriptions herein. The actuators 40, 50 may be used to turn on and turn off the turn signals of the motor vehicle once the controller 60 has activated actuators 40, 50 as provided herein. Thus, in a preferred embodiment, the actuators 40, 50 operate in parallel with the vehicle's stalk switch and the turn signals turn on when activated actuator 40 or activated actuator 50 is depressed and turn off when activated actuator 40 or, respectively, activated actuator 50 is released. Unlike the conventional stalk switch, which turns off when the steering wheel is rotated away from the direction of the turn, in the preferred embodiment of the present invention the turn signals only operate when one of actuator 40 and actuator 50 is depressed. In a critical or high-stress driving situation, a driver need only position his or her thumbs on the actuators 40, 50, depress both of the actuators 40, 50 and maintain them in an "on" position for a pre-determined amount of time, and thereafter operate the turn signals using only one of the actuators 40, 50. With the system and apparatus of the present invention, a turn signal cannot prematurely or accidently turn off. Once the actuators 40, 50 are activated, a turn signal is turned on by depressing one of actuators 40, 50 and it is turned off by releasing the depressed actuator.

In a further embodiment, which employs actuators 40 and 50 of the present invention as illustrated in FIG. 11, two activation settings for actuators 40 and 50 are possible: (1) actuators 40 and 50 require actuator activation upon each start up of the motor vehicle, or (2) actuators 40 and 50 are always activated when the engine of the motor vehicle is turned on after having once been activated. Controller 60 in this embodiment is a programmable controller or, alternatively, a computer-implemented device, which allows for the programming of actuators 40 and 50 with respect to their on/off status. Thus, if both actuator 40 and actuator 50 are depressed, controller 60 via timer 90 (shown in FIG. 10) measures the time each of actuator 40 and actuator 50 is depressed. Controller 60 may be pre-programmed with two threshold time ranges, for example a first threshold time range and a second threshold time range, such that simultaneously depressing actuators 40 and 50 for a time within the first threshold time range, for example 1 to 2 seconds, activates actuators 40 and 50 only for the period of time the engine of the motor vehicle is turned on. It should be noted that those of ordinary skill in the art will understand that the first threshold time range may be as short as a fraction of a second such that actuators 40, 50 are activated rapidly. Furthermore, those of ordinary skill in the art will understand that any threshold time range implemented with respect to embodiments of the present invention may be varied to suit specific needs and uses. In such instance, actuators 40 and 50 would need to be activated as described each time the motor vehicle is turned on. However, if actuators 40 and 50 are simultaneously depressed and held through the first threshold time range and for a duration within the second threshold time range, 3 to 5 seconds for example, actuators 40 and 50 are always on in that they are always activated when the engine of the motor vehicle is turned on. If the measured time is within either the first or second threshold time range, then controller 60 activates actuators 40, 50. If the measured time is less than the first threshold time range, controller 60 does not activate actuators 40, 50. The pre-set threshold time ranges can be varied and programmed into memory 100 shown in FIG. 10 such that logic circuits 80 of FIG. 10 in controller 60 activate actuators 40, 50. The pre-set threshold time ranges may range from about 0.5 seconds to about 5 seconds. It is preferred that the first pre-set threshold time range be about 1 to 2 seconds and that the second pre-set threshold time range be about 3 to 5 seconds. When activated, depressing actuator 40 results in the right side signal lights (not shown) of right-side signal circuit 145 to be energized and when actuator 50 is depressed left-side signal lights (not shown) of left-side signal circuit 155) are energized. When energized, right-side signal lamp and/or left-side signal lamp (not shown) may "blink" as is common to all turn signals.

In yet a further embodiment, upon initial activation of actuators 40 and 50, a display screen (not shown), such as a liquid crystal display ("LCD") mounted in the motor vehicle could display a selectable option for "always on. The use of LCD's in motor vehicles is well known. Such motor vehicle LCD are driven by computers on board the motor vehicle. In the present embodiment, controller 60 could interface with the on board computer or, alternatively, controller 60 could be a component of the on board computer either as a hardwired component, a programmed component such that the on board computer is programmed to perform the function of controller 60, or a combination of the two configurations. If a motor vehicle operator enters "YES," for example, in response to being queried to elect or decline the "always on" option, the selection of the "always on" option is stored in the on board computer's electronic memory or in a digital memory device attached to the on board computer, such that actuators 40 and 50 are activated upon all subsequent start ups of the motor vehicle until the setting is changed.

In other embodiments, the systems and apparatus of the present invention may be used to control equipment components of the motor vehicle other than the turn signals. Such embodiments of the present invention are directed towards allowing a driver to maintain a four-fingered grip on the steering wheel while operating the vehicle's components. Such components may include, but are not limited to, climate control, accessing and controlling the motor vehicle's audio system or a connected device, accessing and using the motor vehicle's navigation system, accessing and using the motor vehicle's cellular telephone, turning on and off the motor vehicle's BLUETOOTH system, accessing the Internet, and shifting the motor vehicle's transmission. Other components which may be controlled by the control system apparatus of the present invention will be recognized by those of ordinary skill in the art.

In one embodiment, with reference to FIG. 13, actuators 40 and 50 function as a computer-driver interface with processor 70 of controller 60, which are collectively used to permit paddle shifting or thumb shifting of a motor vehicle's transmission 250. The present embodiment thus provides an integrated motor vehicle thumb shifter system. For actuators 40 and 50 to be used for thumb shifting, controller 60 would send an electrical signal to system controller 260 which in turn would cause transmission 250 to change gears. System controller 260 may be electromechanical or hydro-mechanical and is of the type well known in the art for operating paddle shifted transmissions. One such system is described in U.S. Pat. No. 7,892,143 (the '143 Patent"). The '143 Patent also describes a complete paddle shift system including controller, transmission and clutch which may be adapted for use with the present invention. System controller 260 would operate those ancillary systems necessary to shifting transmission gears, as well understood by those of ordinary skill in the art, including the transmission itself and the clutch (not shown). The clutch may be one of many different types of clutch known in the art including an electric clutch.

A non-limiting example of how controller 60 could be programmed to permit use of actuators 40 and 50 as thumb shifters is presented. The thumb shifting function could be engaged when the motor vehicle's transmission is in the drive position and both actuators 40 and 50 are simultaneously depressed for a pre-set duration. Right actuator 40 would control shifting up through the gears, that is to say shifting from a lower gear such as first gear to a higher gear such as second gear and the left actuator 50 would control shifting down through the gears from a higher gear to a lower gear. Pressing both actuators 40 and 50 simultaneously for a pre-set duration of time would cause controller 60 to change the transmission to the neutral gear position. In a further embodiment, pressing both actuators 40 and 50 simultaneously while also pressing the motor vehicle's brake pedal would put the transmission in the neutral position. Selecting a transmission gear and exiting from the neutral position by either shifting up or shifting down would be determined by the vehicle's engine's RPM (revolutions per minute) and/or the motor vehicle's speed as calculated by an onboard computer so that the gear selection would not damage the motor vehicle's engine and would be in a gear that corresponds to optimized power band based on engine revolutions per minute, as will be understood by those of ordinary skill in the art. The actuators 40 and 50 would be deactivated by simultaneous depression for a pre-set time that is significantly longer than the duration which causes the transmission to be shifted to the neutral position. Once actuators 40 and 50 are deactivated as thumb shifters, the control of the transmission would revert back to the native automatic transmission state.

FIG. 14 illustrates the circuit logic of one embodiment of the present invention in which actuators 40 and 50 provide thumb-shifting functionality to a motor vehicle. In this embodiment, when actuator 40 is depressed it is in a closed position and it completes a circuit to controller 60. Similarly, when actuator 50 is depressed it completes a circuit to controller 60. If both actuator 40 and actuator 50 are depressed, controller 60 via timer 90 (shown in FIG. 13) measures the time each of actuator 40 and actuator 50 is depressed. If the measured time is within a pre-set activation threshold time range, then controller 60 activates actuators 40, 50. If the measured time is outside of the pre-set activation threshold time range, controller 60 does not activate actuators 40, 50. The pre-set activation threshold time range can be varied and programmed into memory 100 shown in FIG. 13 such that logic circuits 80 of FIG. 13 in controller 60 activate actuators 40, 50. Once activated, actuators 40 and 50 may then be used as thumb shifters and controller 60 via timer 90 (shown in FIG. 13) measures the time each of actuator 40 and actuator 50 is depressed. There will be, in this example, two pre-set threshold time ranges: a first pre-set threshold time range described above which determines whether or not actuators 40, 50 are to be activated and a pre-set neutral time range. The pre-set threshold time ranges will vary based on the function which the actuators 40 and 50 are to perform. For example, to activate actuators 40 and 50 as thumb shifters actuators 40 and 50 would be depressed for a preferred 1 to 2 second duration, although this duration may range from about 0.1 second to 1 second or 0.5 seconds to about 5 seconds. When actuators 40 and 50 are simultaneously depressed after having been activated and released and then depressed again for a duration within a time range of, for example, about 0.1 to about 1 seconds, actuators 40 and 50 signal controller 60 that system controller 260 is to put transmission 250 into the neutral position. When actuator 40 is activated in this example of the present embodiment, depressing actuator 40 alone results in controller 60 sending a signal to system controller 260 to operate the motor vehicle's transmission and shift the transmission to a higher gear. When actuator 50 is activated in this example of the present embodiment, depressing actuator 50 alone results in controller 60 sending a signal to system controller 260 to operate the motor vehicle's clutch and shift the transmission to a lower gear.

The embodiments of the present invention which utilize actuators 40, 50 as thumb shifters as illustrated in FIG. 13 may be further adapted such that actuators 40, 50 may be used to perform various functions of a conventional shifter as will be understood by those of ordinary skill in the art. The following non-limiting examples (Examples 1-6) are presented to further illustrate such adaptations.

Example 1

Activating Actuators 40, 50

When a motor vehicle that has been modified to include the system and apparatus of the present invention, actuators 40, 50 may be activated when the motor vehicle's ignition (not shown) is turned on and the transmission 250 of the motor vehicle is in the neutral or park position. An operator of the motor vehicle may then activate actuators 40 and 50 by simultaneously depressing actuators 40 and 50 for a time that is within a pre-set threshold time range and further described herein above. Alternatively, when the motor vehicle's ignition is turned on and the motor vehicle is stopped (transmission 250 is in the drive position and the motor vehicle operator has engaged the motor vehicle's brake), simultaneously pressing actuators 40 and 50 immediately activates actuators 40 and 50. As further described above, once actuators 40 and 50 are activated, depressing actuator 40 will cause transmission 250 to be up shifted into gear, from park to first gear for example, and depressing 50 will cause transmission 250 to be downshifted, from park to reverse for example. In yet a further adaptation of the present invention, simultaneously pressing actuators 40 and 50 while the motor vehicle is in motion will immediately activate actuators 40, 50 in the corresponding gear at which transmission 250 in when actuators 40, 50 are activated.

Example 2

Operating Actuators 40, 50

When a motor vehicle that has been modified to include the system and apparatus of the present invention, the following example illustrate adaptations of the present invention in which actuators 40 and 50 are activated and are subsequently being used as thumb shifters. In the present adaptation:
1) depressing actuator 40 will cause transmission 250 to be upshifted (from first gear to second gear for example);
2) depressing actuator 50 will cause transmission 250 to be downshifted (from second gear to first gear for example);
3) depressing both actuators 40 and 50 for a first pre-set threshold duration or time range will cause transmission 250 to be shifted into the neutral position; and
4) depressing both actuators 40 and 50 for a second pre-set threshold duration that is longer than the first pre-set threshold duration will turn off actuators 40 and 50.

Example 3

Operating Actuators 40, 50—Further Adaptations

When a motor vehicle that has been modified to include the system and apparatus of the present invention, the following examples illustrate adaptations of the present invention in which the motor vehicle's ignition (not shown) is turned on, and actuators 40 and 50 are activated and are subsequently being used as thumb shifters to place the motor vehicle's transmission 250 into the neutral or park position. In the present adaptation:
1) depressing both actuators 40 and 50, simultaneously, for a first pre-set threshold time range or duration will cause transmission 250 to be placed in the neutral position;
2) continuing to depress actuators 40, 50, simultaneously for a second pre-set threshold duration that is longer than the first pre-set threshold duration will cause transmission 250 to be placed in the park position (the park position of transmission 250 cannot be accessed at any time the motor vehicle is not at a complete stop);
3) with the motor vehicle having been placed in the park position as described in step 2) above, releasing both actuators 40 and 50 and then simultaneously depressing them for the first pre-set threshold duration will cause transmission 250 to be shifted into the neutral position; and
4) continuing to simultaneously depress actuators 40 and 50 for a third pre-set threshold duration, which is longer than both the first pre-set threshold duration and the second pre-set threshold duration will deactivate or turn off actuators 40, 50.

Example 4

Using Actuators 40, 50 to Move the Motor Vehicle Forward

When a motor vehicle that has been modified to include the system and apparatus of the present invention, the following examples illustrate adaptations of the present invention in which the motor vehicle's ignition (not shown) is turned on, and actuators 40 and 50 are activated and are subsequently being used as thumb shifters to move the motor vehicle's transmission 250 from either the park or the neutral position into a forward gear. In the present adaptation:
1) depressing actuator 40 will cause transmission 250 to be placed in first gear and the car will move forward; and
2) in an alternative embodiment of the present adaptation, depressing actuator 40 simultaneously while depressing the motor vehicle's brake pedal will cause transmission 250 to be placed in first gear and the motor vehicle will not move forward until the brake pedal is released.

Example 5

Using Actuators 40, 50 to Move the Motor Vehicle in Reverse

When a motor vehicle that has been modified to include the system and apparatus of the present invention, the following examples illustrate adaptations of the present invention in which the motor vehicle's ignition (not shown) is turned on, and actuators 40 and 50 are activated and are subsequently being used as thumb shifters to move the motor vehicle's transmission 250 from either the park or the neutral position into the reverse gear. In the present adaptation:
1) the reverse position of transmission 250 can be immediately engaged when the motor vehicle is stopped and transmission 250 is either in the neutral position or in the park position by depressing actuator 50; and
2) in another embodiment of the present adaptation, the reverse position of transmission 250 can be immediately engaged when the motor vehicle is stopped in either the neutral or park positions with the motor vehicle's brake pedal depressed by depressing actuator 50.

Example 6

Using Actuators 40, 50 while the Motor Vehicle is in Reverse

When a motor vehicle that has been modified to include the system and apparatus of the present invention, the following examples illustrate adaptations of the present invention in which the motor vehicle's ignition (not shown) is tarried on, and actuators 40 and 50 are activated and are subsequently being used as thumb shifters to move the motor vehicle's transmission 250 into either the park, neutral, or a forward gear position from the reverse gear position. In the present adaptation:

1) while the motor vehicle's transmission is in the reverse position and the motor vehicle is moving backwards, depressing actuators 40, 50 simultaneously will immediately engage the neutral position of transmission 250; and
2) while motor vehicle's transmission is in reverse and the motor vehicle is stopped, depressing actuators 40, 50 simultaneously will engage the transmission neutral position if actuators 40 and 50 are depressed for a first pre-set threshold duration as described above or, alternatively, depressing actuators 40, 50 simultaneously for second pre-set threshold duration that is longer than the first pre-set threshold duration will cause transmission 250 to be placed in the park position; and
3) while transmission 250 is in the reverse position and the motor vehicle is stopped, depressing actuator 40 will cause transmission 250 to be placed into first gear.

Figure 15:
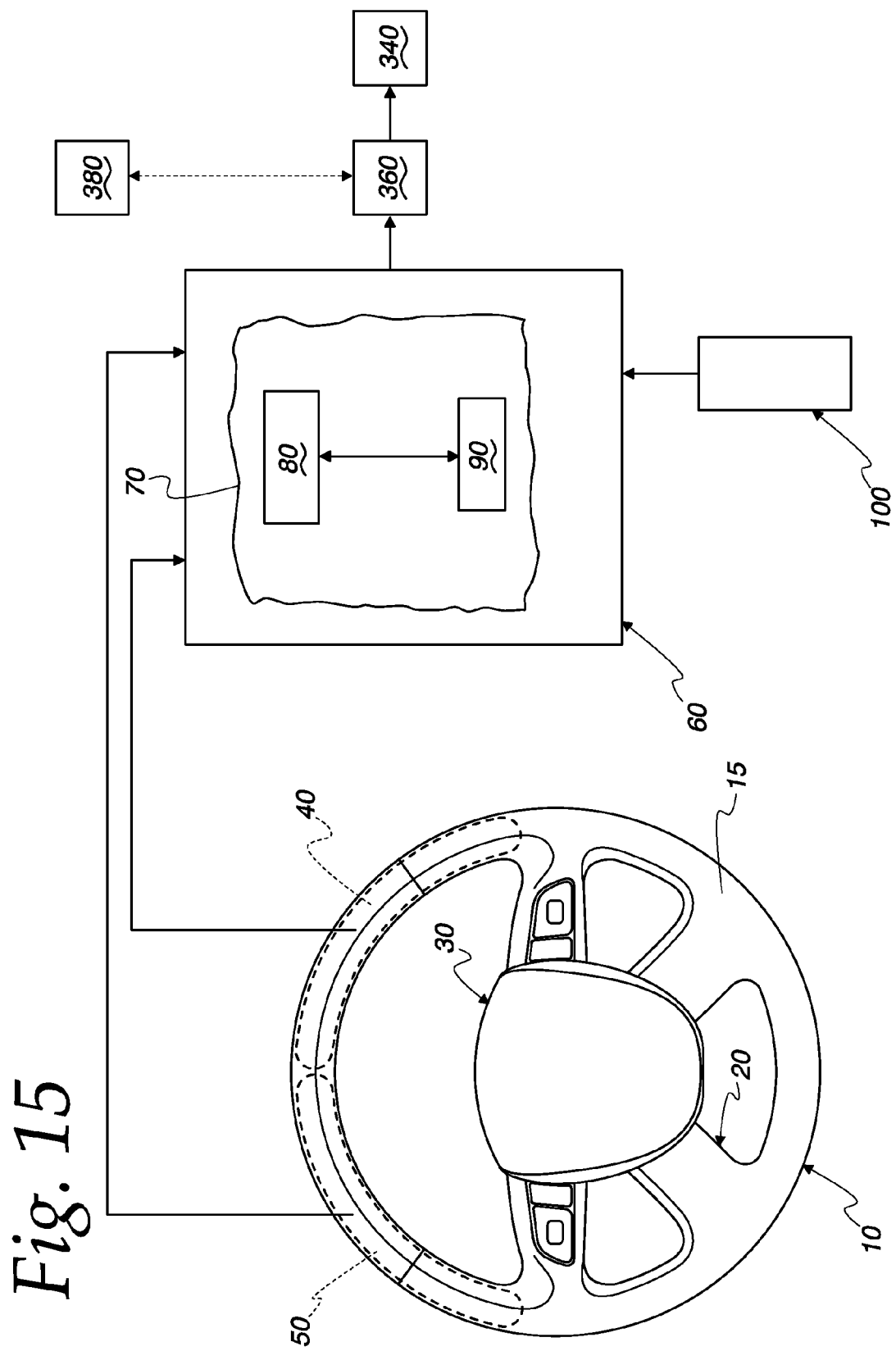
FIG. 15 is a diagram of an embodiment of the system of the present invention showing a steering wheel, controller, interface controller, display screen and equipment component.

In a further embodiment, as illustrated in FIG. 15, controller 60 is connected to interface controller 360 which is native to the vehicle and controls the selection of available equipment components 340 on the motor vehicle and the equipment component functions and provides an integrated motor vehicle equipment component control system. For example, the interface controller 360 could be a computer-driver interface such as a BMW IDRIVE system. The IDRIVE system, illustrated by equipment component 340 in FIG. 15, and similar systems offered in some form by most automakers, provide the operator with the ability to control the setting and operation of various equipment components in the motor vehicle such as a climate control system, an audio system, a navigation system, a cellular phone, a BLUETOOTH device, a system for accessing the internet, and the motor vehicle's turn signals. The available equipment components and their functions are made viewable either via a display screen 380 often located in the center of the dash of the motor vehicle facing the front seat passengers, or a small screen located in the driver's instrument panel often between the speedometer and tachometer facing the driver, or a HUD projected on the windshield in front of the driver, or a combination of these readouts. In this embodiment, interface controller 360 would be programmed to allow the operator to assign a specific function to either actuator 40 or 50 (including a motor vehicle's turn signals) and function selection would be performed by using a system selector native to the vehicle, such as a dial, mouse, joystick, or touch-screen capability incorporated into display screen 380. Such system selector functionality is widely used on commercially available motor vehicles, including passenger automobiles, and is therefore understood by persons of ordinary skill in the art.

As an example of the embodiment of the present invention illustrated in FIG. 15, interface controller 360 would be programmed to allow the operator to assign a specific function to either actuator 40 or 50 and such program would be stored in memory (100 in FIG. 15) and would control which equipment component or function the operation actuators 40 and 50 function affected once the actuators 40 and 50 were activated according to the methods of the present invention. Selection of an equipment component's function would be performed by using a system selector native to the vehicle, such as a dial, mouse, joystick, or touch-screen capability incorporated into display screen 380. Alternatively, controller 60 could be programmed to perform the functions of interface controller 360 as described above. Upon starting the motor vehicle, either by starting the engine by turning the vehicle's electrical power on without starting the engine the motor vehicle operator depresses both actuator 40 and 50 simultaneously for a pre-set duration, a first interval, providing an activated actuator 40, 50. Without releasing actuators 40 and 50, the motor vehicle operator continues to depress both actuators 40 and 50 for an additional pre-set duration, a second interval, which is longer than the first interval. For convenience, the during the first and second intervals an audible signal can be caused to emanate from an audio speaker in the motor vehicle to signal to the motor vehicle operator that the actuators 40 and 50 have been depressed for the appropriate pre-set durations. After actuators 40 and 50 have been depressed for the pre-set second interval, a signal is sent via controller (60) to interface controller 360 causing interface controller 360 to enter a mode for assigning which equipment components and functions actuators 40 and 50 will be assigned to operate. That interface controller 360 has entered the mode for assigning which equipment components and functions actuators 40 and 50 will be assigned to operate could be accompanied by an audible signal and/or a display on display screen 380. The motor vehicle operator could then toggle or scroll through the vehicle's available equipment components and functions with a selector native to the vehicle connected to the controller 360, and, optionally controller 60. The steps of the process of selecting the motor vehicle's equipment components and functions may be displayed on display screen 380. Upon the motor vehicle operator selecting a desired equipment component or function, by for example causing the selection to be highlighted on display screen 380 and then entering the selection at display screen 380, the motor vehicle operator would then depress one of actuator 40, 50 for a pre-set duration which assign that corresponding actuator to the highlighted function. The assignment of the actuator 40 or 50 could be accompanied by an audible signal and/or a display on display screen 380 indicating to the motor vehicle operator that the assignment has been successful. It should be noted that the assignment of an equipment component or function to actuators 40, 50 may be performed via interface controller 360 and display screen 380 even if actuators 40, 50 are not activated. In such an adaptation of the present invention the selection will be stored in the motor vehicle's onboard computer memory until such time as actuators 40, 50 are activated. In a further embodiment, interface controller 360 and display screen 380, or other input/output devices used with a motor vehicle's onboard computer, may be used to activate/deactivate actuators 40, 50.

In further embodiments of the present invention, the duration actuators 40 and 50 are depressed, either simultaneously or individually, could correspond to different functionalities depending on what type of equipment component and function is assigned to the actuator. For example, when actuators 40 and 50 are assigned to control a motor vehicle's audio system, different commands such as pause, next track, previous track, rewind, or fast forward, could correspond to depressing actuators 40 and/or 50 for a short duration, multiple short durations, a long duration, or a combination of any of these durations. Such control functionality is known to be used with IPOD headphones, for example, with the IPOD remote connected to the headphone's right ear wire, as will be readily understood of those of ordinary skill in the art.

Figure 16:
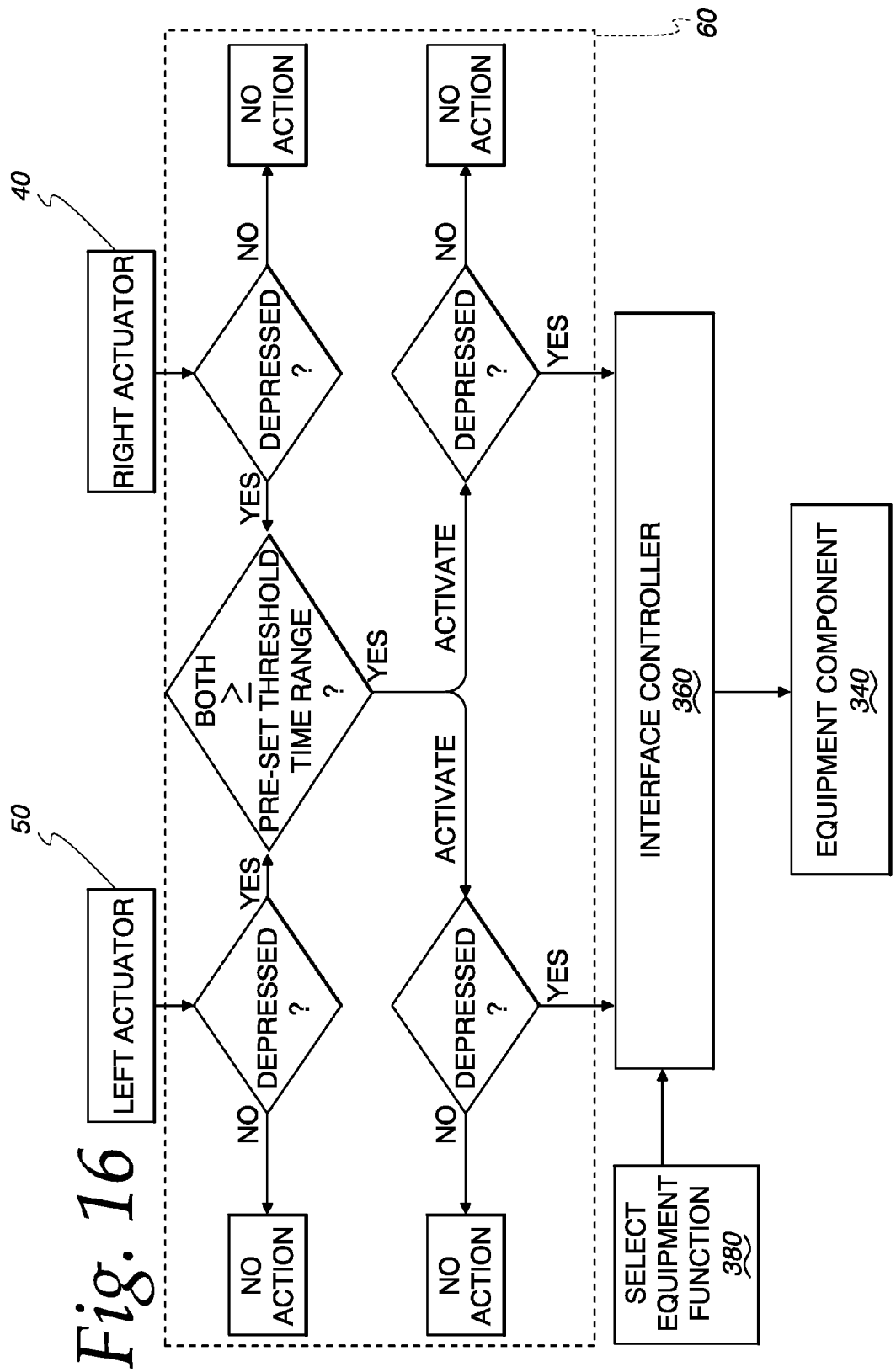
FIG. 16 is a logic diagram illustrating the operation of an embodiment of the present invention which controls an equipment component.

In a further embodiment, which employs actuators 40 and 50 of the present invention as illustrated in FIG. 16, two activation settings for actuators 40 and 50 are possible: (1) actuators 40 and 50 require actuator activation upon each start up of the motor vehicle, or (2) actuators 40 and 50 are always activated when the engine of the motor vehicle is turned on after having once been activated. Controller 60 in this embodiment is a programmable controller or, alternatively, a computer-implemented device, which allows for the programming of actuators 40 and 50 with respect to their on/off status. Thus, if both actuator 40 and actuator 50 are depressed, controller 60 via timer 90 (shown in FIG. 15) measures the time each of actuator 40 and actuator 50 is depressed. Controller 60 may be pre-programmed with two threshold time ranges, for example a first threshold time range and a second threshold time range, such that simultaneously depressing actuators 40 and 50 for a time within the first threshold time range, for example 1 to 2 seconds, activates actuators 40 and 50 only for the period of time the engine of the motor vehicle is turned on. In such instance, actuators 40 and 50 would need to be activated as described each time the motor vehicle is turned on. However, if actuators 40 and 50 are simultaneously depressed and held through the first threshold time range and for a duration within or greater than the second threshold time range, 3 to 5 seconds for example, actuators 40 and 50 are always on in that they are always activated when the engine of the motor vehicle is turned on. If the measured time is within either the first or second threshold time range, then controller 60 activates actuators 40, 50. If the measured time is less than the first threshold time range, controller 60 does not activate actuators 40, 50. The pre-set threshold time ranges can be varied and programmed into memory 100 shown in FIG. 15 such that logic circuits 80 of FIG. 15 in controller 60 activate actuators 40, 50. The pre-set threshold time ranges may range from about 0.1 seconds to about 5 seconds. It is preferred that the first pre-set threshold time range be about 0.1 to 2 seconds and that the second pre-set threshold time range be greater than the first pre-set threshold time range. When activated, depressing actuator 40 causes the interface controller 360 to initiate a function of equipment component 340, while depressing activated actuator 50 causes interface controller 360 to initiate a different function of equipment component 340. For example, the system and apparatus of the present invention may be programmed, as will now be understandable to those of ordinary skill in the art, such that depressing actuator 40 will cause controller 60 to send a signal to interface controller 360 which turns on the motor vehicle's compact disc player, whereas depressing actuator 50 will cause controller 60 to send a signal to interface controller 360 which turns off the motor vehicles compact disc player. Other variations and permutations of this embodiment will be adaptable by those of ordinary skill in the art. The steps of the process of selecting the motor vehicle's equipment components and functions may be displayed on display screen 380. Upon the motor vehicle operator selecting a desired equipment component or function, by for example causing the selection to be highlighted on display screen 380 and then entering the selection at display screen 380, the motor vehicle operator would then depress one of actuator 40, 50 for a pre-set duration which assign that corresponding actuator to the highlighted function. The assignment of the actuator 40 or 50 could be accompanied by an audible signal and/or a display on display screen 380 indicating to the motor vehicle operator that the assignment has been successful.

In yet a further embodiment, the logic diagram illustrated in FIG. 12 (FIGS. 12*a* and 12*b* inclusive) may be adapted for the operation of a motor vehicle equipment component (not shown), such that functions of the motor vehicle component replace the "left signal lamp on" and "right signal lamp on" functions shown in FIG. 12. With reference to FIG. 12, actuator 40 and actuator 50 for purposes of this embodiment are each made up of switch arrays 140, 150, respectively, where each switch array 140, 150 includes a plurality of switches 160. The switches 160 are normally open (off), closed when depressed or selected (on), and return to open (off) when deselected. Each of switches 160 is connected to a controller 60 so that controller 60 may sense when a switch 160 is in the open position or the closed position. In a typical operation, a switch 160 opens and closes an electrical circuit between the switch 160 and the controller 60. If only switches 160 corresponding to a thumb pattern are depressed, then the actuators 40, 50 will be recognized as being "on" by the controller 60. However, if switches 160 corresponding to a pattern larger than a thumb-sized pattern are depressed, then actuators 40, 50 will be recognized as being "off." The controller 60 is programmed to determine when switches 160 are depressed in a thumb-sized pattern. Thus, if a full four-fingered grip is taken of steering wheel 10 a pattern of switches 160 may be depressed, depending on where the driver places his or her hand on the steering wheel, which exceeds the size of the thumb-sized pattern made when a thumb depresses actuators 40, 50. Under this condition, controller 60 does not activate actuators 40, 50 and controller 60 recognizes actuators 40, 50 as being in the "off" position. However, if a thumb is then placed on actuators 40, 50, controller 60 registers that a thumb-sized pattern of switches has been depressed and controller 60 will activate the actuators 40, 50 if they are depressed for at least the pre-set threshold time. When controller 60 activates actuators 40, 50, either one of actuator 40 or actuator 50 may be depressed to initiate the corresponding function of the motor vehicle equipment component (not shown). If controller 60 has not activated actuators 40, 50, then depressing either of actuator 40 or actuator 50 will not initiate the corresponding function of the motor vehicle equipment component (not shown).

The advent of "hands-free" controls in a motor vehicle has been primarily in response to the desire to keep a motor vehicle operator's hands on the wheel. There may be many commands that a motor vehicle operator would prefer to keep secret. In a further embodiment of the present invention, actuators 40 and/or 50 may be used by a motor vehicle operator to covertly send a distress call to 911 while appearing to simply drive the car with two hands where controller 60 is programmed to send a distress call to 911 upon actuators 40 and/or 50 being depressed in a pre-programmed sequence. In vehicles equipped with GPS systems, the distress call could also send police a real-time location and potentially also activate a hidden camera in the car capturing a picture or video image of the perpetrator.

Embodiments of the present invention may be adapted for use in automobiles to operate turn signals, control the high beam light functionality of headlights, control fog lights, operate the automobile's sound and/or entertainment system, operate the automobile's cellular telephone operations, operate a BLUETOOTH system, operate automobile's navigation system, operate the automobile's rear seat DVD player, operate an IPOD connected to the automobile's entertainment system, operate window/sunroof controls, operate parking assist cameras and access and operate an automobile's night vision. Embodiments of the present invention may also be adapted for use in military vehicles such as HUMVEES, JEEPS and trucks. The systems and apparatus herein of integrating actuators into the steering wheel of a vehicle could enable a military vehicle operator to operate a radio, send a distress call, operate the vehicle's navigation system, operate the vehicle's lights, or operate the vehicle's weapons systems. A lone military vehicle operator could, for example, use actuator 50 to rotate a turret gun and actuator 40 to fire it, all the while maintaining a secure grip on the vehicle's steering wheel. Embodiments of the present invention can also be adapted for use on industrial or farming vehicles, marine vessels, fire engines, ambulances, armored cars, police cars, all-terrain vehicles and golf carts.

Thus, it is apparent that there has been provided, in accordance with the present invention, a turn signal activation switch and system and vehicle control system and apparatus for operating the vehicle's components which are, respectively, integral to the rim of a steering wheel that fully satisfies the objects, aims and advantages set forth above.

While the invention has been described in conjunction with specific embodiments thereof, it is evident that many alternatives, modifications and variations will be apparent to those skilled in the art in light of the foregoing description. Accordingly, it is intended that the present invention is not limited by the foregoing description. Rather, it includes all such alternatives, modifications and variations as set forth within the spirit and scope of the appended claims.

What is claimed is:

1. An integrated vehicle equipment component control system for use with a motor vehicle steering wheel having an annular ring and a motor vehicle equipment component having a function, the motor vehicle equipment component being selected from the group consisting of a sound system, an entertainment system, a radio, an on-board camera, a heads-up display, a night-vision system, a compact disc player, a connected device, a cellular telephone, a navigation system, an Internet access system, and a BLUETOOTH® system, the integrated motor vehicle equipment component control system comprising:

a left actuator, the left actuator attached to the steering wheel annular ring between the 9 o'clock and 12 o'clock positions on the annular ring;

a right actuator, the right actuator attached to the steering wheel annular ring between the 3 o'clock and 12 o'clock positions on the annular ring;

a controller, the controller connected to the left and right actuators, the controller further connected to the motor vehicle component;

wherein the left actuator and the right actuator do not overlap;

wherein the controller activates the left actuator and the right actuator when the left and the right actuators are depressed simultaneously and held for a pre-set threshold time, thus providing an activated left actuator and an activated right actuator; and wherein the function of the motor vehicle equipment component is activated when an activated actuator is depressed, the actuator selected from the group consisting of the left actuator and the right actuator.

2. The integrated motor vehicle equipment component control system of claim 1 wherein each of the right actuator and the left actuator include a switch array.

3. The integrated motor vehicle equipment component control system of claim 2 wherein the controller activates the left and right actuators when thumb-sized patterns of switches in the switch array of each of the left and the right actuators are simultaneously depressed.

4. The integrated vehicle component system of claim 3, wherein the component has a plurality of functions and the controller is configured to activate a first function when the activated left actuator is depressed and to activate a second function when the activated right actuator is depressed.

5. The integrated motor vehicle component control system of claim 3, wherein the controller is configured to activate the function when a first thumb-sized pattern of switches in a one of the activated left actuator and the activated right actuator is depressed, and to activate the function when a second thumb-sized pattern of switches in the one of the activated left actuator and the activated right actuator is depressed.

6. The integrated motor vehicle component control system of claim 3, wherein the function comprises a plurality of functions and the controller is configured to activate a first one of the plurality of functions when a first thumb-sized pattern of switches in a one of the activated left actuator and the activated right actuator is depressed, and to activate a second one of plurality of functions when a second thumb-sized pattern of switches in the one of the activated left actuator and the activated right actuator is depressed.

7. The integrated motor vehicle equipment component control of claim 1 wherein an end of the left actuator is positioned proximal to the 9 o'clock position on the steering wheel annular ring and the opposite end of the left actuator is positioned proximal to the 12 o'clock position on the steering wheel annular ring, such that the left actuator is sized to span the distance between the 9 o'clock and 12 o'clock positions.

8. The integrated motor vehicle equipment component control system of claim 1 wherein an end of the right actuator is positioned proximal to the 3 o'clock position on the steering wheel annular ring and the opposite end of the right actuator is positioned proximal to the 12 o'clock position on the steering wheel annular ring, such that the right actuator is sized to span the distance between the 3 o'clock and 12 o'clock positions.

9. The integrated motor vehicle equipment component control system of claim 1 further comprising means for generating an audible signal; wherein the audible signal sounds when either the left actuator or the right actuator is depressed.

10. The integrated motor vehicle equipment component control system of claim 1, wherein the left actuator has an arc-segment-length of approximately two inches and the right actuator has an arc-segment-length of approximately two inches.

11. The integrated motor vehicle equipment component control system of claim 10, wherein the left actuator covers a portion of the annular ring ending at the 11 o'clock position and extending counterclockwise towards the 9 o'clock position and the right actuator covers a portion of the annular ring ending at the 1 o'clock position and extending clockwise towards the 3 o'clock position.

12. The integrated vehicle component system of claim 1, wherein the component has a plurality of functions and the controller is configured to activate a first function when the activated left actuator is depressed and to activate a second function when the activated right actuator is depressed.

13. The integrated motor vehicle equipment component control system of claim 1, wherein the component has a plurality of functions, a one of the left actuator and the right actuator comprises a plurality of actuators, and the controller is configured to activate a one of the plurality of functions when a first activated one of the plurality of actuators is depressed and to activate a one of the plurality of functions when a second activated one of the plurality of actuators is depressed.

14. The integrated motor vehicle component control system of claim 13, wherein the controller is configured to activate a first one of the plurality of functions when a first activated one of the plurality of actuators is depressed and to activate a second one of the plurality of functions when a second activated one of the plurality of actuators is depressed.

15. An integrated motor vehicle equipment component control system for use with a motor vehicle steering wheel having an annular ring, the annular ring having a skin, and a motor vehicle equipment component, the motor vehicle equipment component being selected from the group consisting of a sound system, an entertainment system, a radio, an on-board camera, a heads-up display, a night-vision system, a compact disc player, a connected device, a cellular telephone, a navigation system, an Internet access system, and a BLUETOOTH® system, the motor vehicle equipment component having a plurality of functions, the integrated motor vehicle equipment component control system comprising:
- a left actuator, the left actuator attached to the steering wheel annular ring between the 9 o'clock and 12 o'clock positions on the annular ring, the left actuator covered by the skin;
- a right actuator, the right actuator attached to the steering wheel annular ring between the 3 o'clock and 12 o'clock positions on the annular ring, the right actuator covered by the skin;
- a controller, the controller connected to the left and right actuators, the controller further connected to a system controller, the system controller adapted to activate at least a first function and a second function;
- wherein the left actuator and the right actuator do not overlap;
- wherein the controller activates the left actuator and the right actuator when the left and the right actuators are depressed simultaneously and held for a pre-set threshold time, thus providing an activated left actuator and an activated right actuator;
- wherein the first function is activated when the activated left actuator is depressed; and wherein the second function is activated when the activated right actuator is depressed.

16. The integrated motor vehicle equipment component control system of claim 15 wherein each of the right actuator and the left actuator include a switch array.

17. The integrated motor vehicle equipment component control system of claim 16 wherein the controller activates the left and right actuators when thumb-sized patterns of switches in the switch array of each of the left and the right actuators are simultaneously depressed.

18. The integrated vehicle component system of claim 17, wherein the controller is configured to activate a first function when the activated left actuator is depressed and to activate a second function when the activated right actuator is depressed.

19. The integrated motor vehicle component control system of claim 17, wherein the controller is configured to activate a one of the plurality of functions when a first thumb-sized pattern of switches in a one of the activated left actuator and the activated right actuator is depressed, and to activate the one of the plurality of functions when a second thumb-sized pattern of switches in the one of the activated left actuator and the activated right actuator is depressed.

20. The integrated motor vehicle component control system of claim 17, the controller is configured to activate a first one of the plurality of functions when a first thumb-sized pattern of switches in a one of the activated left actuator and the activated right actuator is depressed, and to activate a second one of plurality of functions when a second thumb-sized pattern of switches in the one of the activated left actuator and the activated right actuator is depressed.

21. The integrated motor vehicle equipment component control system of claim 15 wherein the left actuator and the right actuator are molded into the annular ring of the steering wheel.

22. The integrated motor vehicle equipment component control system of claim 15 wherein the integrated motor vehicle equipment component control system is installed on a motor vehicle selected from the group consisting of an automobile, a small, sturdy motor vehicle with four-wheel drive, a truck, a motorized farm machine, a military vehicle, a marine vessel, an all-terrain vehicle and a golf cart.

23. The integrated motor vehicle equipment component control system of claim 15, wherein the left actuator has an arc-segment-length of approximately two inches and the right actuator has an arc-segment-length of approximately two inches.

24. The integrated motor vehicle equipment component control system of claim 23, wherein the left actuator covers a portion of the annular ring ending at the 11 o'clock position and extending counterclockwise towards the 9 o'clock position and the right actuator covers a portion of the annular ring ending at the 1 o'clock position and extending clockwise towards the 3 o'clock position.

25. The integrated vehicle component system of claim 15, wherein the controller is configured to activate a first function when the activated left actuator is depressed and to activate a second function when the activated right actuator is depressed.

26. The integrated motor vehicle equipment component control system of claim 15, wherein a one of the left actuator and the right actuator comprises a plurality of actuators, and the controller is configured to activate a one of the plurality of functions when as first activated one of the plurality of actuators is depressed and to activate a one of the plurality of functions when a second activated one of the plurality of actuators is depressed.

27. The integrated motor vehicle component control system of claim 26, wherein the controller is configured to activate a first one of the plurality of functions when a first activated one of the plurality of actuators is depressed and to activate a second one of the plurality of functions when a second activated one of the plurality of actuators is depressed.

28. An integrated motor vehicle thumb shifter system for use with a motor vehicle steering wheel having an annular ring and a motor vehicle transmission, the integrated motor vehicle thumb shifter system comprising:
- a left actuator, the left actuator attached to the steering wheel annular ring between the 9 o'clock and 12 o'clock positions on the annular ring;
- a right actuator, the right actuator attached to the steering wheel annular ring between the 3 o'clock and 12 o'clock positions on the annular ring;
- a controller, the controller connected to the left and right actuators, the controller further connected to a system controller, the system controller adapted to operate the transmission;
- wherein the left actuator and the right actuator do not overlap;
- wherein the controller activates the left actuator and the right actuator when the left and the right actuators are depressed simultaneously and held for a pre-set threshold time, thus providing an activated left actuator and an activated right actuator;
- wherein the system controller is activated when an activated actuator is depressed, the activated actuator selected from the group consisting of the activated left actuator and the activated right actuator; and Wherein the system controller causes the transmission to shift up when a one of the activated actuators is depressed and to shift down when the other of the activated actuators is depressed.

29. The integrated motor vehicle thumb shifter system of claim 28 wherein the system controller will cause the transmission to shift into the neutral position when the activated left and right actuators are simultaneously depressed.

30. The integrated motor vehicle thumb shifter system of claim 28 wherein the system controller will cause the transmission to shift into the park position when the activated left and right actuators are simultaneously depressed and the motor vehicle is not moving.

31. The integrated motor vehicle thumb shifter system of claim 28 wherein each of the right actuator and the left actuator include a switch array.

32. The integrated motor vehicle equipment component control system of claim 31 wherein the controller activates the left and right actuators when thumb-sized patterns of switches in the switch array of each of the left and the right actuators are simultaneously depressed.

33. The integrated motor vehicle equipment component control system of claim 28, wherein the left actuator has an arc-segment-length of approximately two inches and the right actuator has an arc-segment-length of approximately two inches.

34. The integrated motor vehicle equipment component control system of claim 33, wherein the left actuator covers a portion of the annular ring ending at the 11 o'clock position and extending counterclockwise towards the 9 o'clock position and the right actuator covers a portion of the annular ring ending at the 1 o'clock position and extending clockwise towards the 3 o'clock position.

* * * * *

UNITED STATES PATENT AND TRADEMARK OFFICE
CERTIFICATE OF CORRECTION

PATENT NO. : 8,446,265 B2
APPLICATION NO. : 13/465468
DATED : May 21, 2013
INVENTOR(S) : Adam Simon Golomb It is certified that error appears in the above-identified patent and that said Letters Patent is hereby corrected as shown below:

On the title page, item [56]:

Foreign Patent Documents:
"WO WO-0131543 2001 5/2001" should be --WO-2011-031543 3/17/2011--

Other Publications:
"RLP Engineering, Intellitrun "A Brief History of Turn Signals"/www.rlpengineering.com/history.htm (2 Pages)" should be --RLP Engineering, Intelliturn "A Brief History of Turn Signals"/www.rlpengineering.com/history.htm (2 Pages)--

"SmartMotorist.com, "Where To Put Hand On the Steering Wheel?" (4 pages)" should be --SmartMotorist.com, "Where To Put Hands On the Steering Wheel?" (4 pages)--

In the Specification

Column 18, Line 62, the word "tarried" should be --turned--

In the Claims

Column 26, Line 25, the word "as" should be --a--
Column 26, Line 59, the word "Wherein" should be --wherein--

Signed and Sealed this
Third Day of December, 2013

Margaret A. Focarino
*Commissioner for Patents of the United States Patent and Trademark Office*